US012714007B2

(12) United States Patent
Demiter et al.

(10) Patent No.: US 12,714,007 B2
(45) Date of Patent: Aug. 25, 2026

(54) SEED METER CONTROLLER AND ASSOCIATED TESTING DEVICES, SYSTEM, AND METHODS

(71) Applicant: Ag Leader Technology, Ames, IA (US)

(72) Inventors: Roger Demiter, Ames, IA (US); Jacob Christensen, Ames, IA (US); Tony Woodcock, Ames, IA (US)

(73) Assignee: Ag Leader Technology, Ames, IA (US)

( * ) Notice: Subject to any disclaimer, the term of this patent is extended or adjusted under 35 U.S.C. 154(b) by 935 days.

(21) Appl. No.: 17/127,812

(22) Filed: Dec. 18, 2020

(65) Prior Publication Data

US 2021/0185903 A1 Jun. 24, 2021

Related U.S. Application Data

(60) Provisional application No. 62/949,629, filed on Dec. 18, 2019.

(51) Int. Cl.
*A01C 19/02* (2006.01)

(52) U.S. Cl.
CPC .................................... *A01C 19/02* (2013.01)

(58) Field of Classification Search
CPC ........... A01C 7/20; A01C 7/105; A01C 19/02; A01C 19/00
USPC ...................... 324/765.01; 340/684; 111/921
See application file for complete search history.

(56) References Cited

U.S. PATENT DOCUMENTS 9,439 A 12/1852 Colver
54,633 A 5/1866 Wilkinson
140,493 A 7/1873 Fulghum et al.
540,458 A 6/1895 Robbins
605,348 A 6/1898 Schultz
658,348 A 9/1900 Crowley
717,048 A 12/1902 Stirling
1,178,765 A 4/1916 Waterman
1,220,684 A 3/1917 Ray
1,252,923 A * 1/1918 Name not available .................... A01C 7/18 111/16
1,264,454 A 4/1918 Terrell
1,376,933 A 5/1921 Gould, Jr.

(Continued)

FOREIGN PATENT DOCUMENTS

AU 2006203367 A1 2/2007
AU 2010201330 A1 3/2011

(Continued)

OTHER PUBLICATIONS

8910 Floating Hitch Cultivator, available as early as 2010—https://www.bourgault.com/en-us/products/tillage/8910-cultivator.

(Continued)

*Primary Examiner* — Alicia Torres

(74) *Attorney, Agent, or Firm* — DENTONS DAVIS BROWN PC; Matthew Warner-Blankenship; Kassandra Rittmer

(57) ABSTRACT

A testing system including a row control module, a sensor in communication with the row control module, and a seed delivery system in communication with the row control module. The system configured such that the seed delivery system is activated by activation of the sensor. The sensor may be a magnetic sensor.

20 Claims, 8 Drawing Sheets

(56) References Cited

U.S. PATENT DOCUMENTS

| | | | | | |
|---|---|---|---|---|---|
| 1,397,689 | A | | 11/1921 | Krotz | |
| 1,566,187 | A | | 12/1925 | Fifer | |
| 1,678,643 | A | | 7/1928 | Kassebeer | |
| 1,731,356 | A | | 10/1929 | Smith | |
| 1,997,791 | A | | 4/1935 | Hoberg | |
| 2,053,390 | A | | 9/1936 | Bateman et al. | |
| 2,054,552 | A | | 9/1936 | Wakeham | |
| 2,141,044 | A | | 12/1938 | Rassmann | |
| 2,340,163 | A | | 1/1944 | White | |
| 2,357,760 | A | | 9/1944 | Peacock | |
| 2,440,846 | A | | 5/1948 | Cannon | |
| 2,510,658 | A | | 6/1950 | Rassmann | |
| 2,525,435 | A | * | 10/1950 | White | A01C 7/18 360/79 |
| 2,566,406 | A | | 9/1951 | Dougherty | |
| 2,589,762 | A | | 3/1952 | Barnett et al. | |
| 2,673,536 | A | | 3/1954 | Skinner | |
| 2,913,086 | A | | 11/1959 | Wade | |
| 2,975,936 | A | | 3/1961 | Rousek | |
| 2,980,043 | A | | 4/1961 | Beck | |
| 3,077,290 | A | | 2/1963 | Rehder | |
| 3,122,283 | A | | 2/1964 | Walters | |
| 3,176,636 | A | | 4/1965 | Wilcox et al. | |
| 3,233,523 | A | | 2/1966 | Passaggio | |
| 3,253,739 | A | | 5/1966 | Martin | |
| 3,272,159 | A | | 9/1966 | Sanderson | |
| 3,325,060 | A | | 6/1967 | Rehder | |
| 3,343,507 | A | | 9/1967 | Smith | |
| 3,413,941 | A | | 12/1968 | Roberson | |
| 3,463,010 | A | | 8/1969 | Hatschek | |
| 3,509,837 | A | | 5/1970 | Erickson | |
| 3,693,833 | A | | 9/1972 | Weitz | |
| 3,718,191 | A | | 2/1973 | Williams | |
| 3,749,035 | A | | 7/1973 | Cayton | |
| 3,796,346 | A | | 3/1974 | Ribouleau | |
| 3,797,418 | A | | 3/1974 | Bridger | |
| 3,844,357 | A | | 10/1974 | Ellinger | |
| 3,913,503 | A | | 10/1975 | Becker | |
| 3,990,606 | A | | 11/1976 | Gugenhan | |
| 4,002,266 | A | | 1/1977 | Beebe | |
| 4,023,509 | A | | 5/1977 | Hanson | |
| 4,026,437 | A | | 5/1977 | Biddle | |
| 4,029,235 | A | | 6/1977 | Grataloup | |
| 4,037,755 | A | | 7/1977 | reuter | |
| 4,116,139 | A | | 9/1978 | Sauer | |
| 4,122,974 | A | | 10/1978 | Harbert | |
| 4,167,910 | A | | 9/1979 | Pretzer | |
| 4,193,458 | A | | 3/1980 | Long | |
| 4,193,523 | A | | 3/1980 | Koning | |
| 4,209,109 | A | * | 6/1980 | Curl | A01C 9/00 335/205 |
| 4,282,985 | A | | 8/1981 | Yamamoto | |
| 4,288,008 | A | | 9/1981 | Amblard | |
| 4,324,347 | A | | 4/1982 | Thomas | |
| 4,329,911 | A | | 5/1982 | Schwerin | |
| 4,333,561 | A | | 6/1982 | Schlegel | |
| 4,359,104 | A | | 11/1982 | Haapala | |
| 4,417,530 | A | | 11/1983 | Kopecky | |
| 4,449,642 | A | | 5/1984 | Dooley | |
| 4,596,200 | A | | 6/1986 | Gafford | |
| 4,600,122 | A | | 7/1986 | Lundie et al. | |
| 4,613,056 | A | | 9/1986 | Olson | |
| 4,646,663 | A | | 3/1987 | Nikkel | |
| 4,653,410 | A | | 3/1987 | Typpi | |
| 4,655,296 | A | | 4/1987 | Bourgault | |
| 4,700,785 | A | | 10/1987 | Bartusek | |
| 4,765,423 | A | | 8/1988 | Karpa | |
| 4,793,511 | A | | 12/1988 | Ankum et al. | |
| 4,796,550 | A | | 1/1989 | Van Natta | |
| 4,865,132 | A | | 9/1989 | Moore | |
| 4,878,443 | A | | 11/1989 | Gardner | |
| 4,899,672 | A | | 2/1990 | Paul | |
| 4,913,070 | A | | 4/1990 | Morrison | |
| 4,949,656 | A | | 8/1990 | Lyle | |
| 4,949,869 | A | | 8/1990 | Ribouleau | |
| 4,986,782 | A | | 1/1991 | severtson | |
| 5,058,766 | A | | 10/1991 | Deckler | |
| 5,065,681 | A | | 11/1991 | Hadley | |
| 5,069,779 | A | | 12/1991 | brown | |
| 5,074,227 | A | | 12/1991 | Schwitters | |
| 5,103,924 | A | | 4/1992 | Walker | |
| 5,161,472 | A | | 11/1992 | Handy | |
| 5,163,518 | A | | 11/1992 | Foley | |
| 5,170,909 | A | | 12/1992 | Lundle | |
| 5,234,060 | A | | 8/1993 | Carter | |
| 5,277,257 | A | | 1/1994 | Thompson | |
| 5,333,559 | A | | 8/1994 | Hodapp | |
| 5,366,024 | A | | 11/1994 | Payne | |
| 5,425,318 | A | | 6/1995 | Keeton | |
| 5,427,182 | A | | 6/1995 | Winter | |
| 5,479,992 | A | | 1/1996 | Bassett | |
| 5,497,837 | A | | 3/1996 | Kehrney | |
| 5,499,683 | A | | 3/1996 | Bassett | |
| 5,501,366 | A | | 3/1996 | Fiorido | |
| 5,529,128 | A | | 6/1996 | Peterson | |
| 5,601,209 | A | | 2/1997 | Barsi et al. | |
| 5,664,507 | A | | 9/1997 | Bergland | |
| 5,697,308 | A | | 12/1997 | Rowlett | |
| 5,709,271 | A | | 1/1998 | Bassett | |
| 5,720,233 | A | | 2/1998 | Lodico | |
| 5,740,747 | A | | 4/1998 | Stufflebeam | |
| 5,765,720 | A | | 6/1998 | Stufflebeam | |
| 5,799,598 | A | | 9/1998 | Stufflebeam | |
| 5,829,535 | A | | 11/1998 | Line | |
| 5,842,428 | A | | 12/1998 | Stufflebeam et al. | |
| 5,848,571 | A | | 12/1998 | Stufflebeam | |
| 5,862,764 | A | | 1/1999 | Umemoto | |
| 5,915,313 | A | | 6/1999 | Bender | |
| 5,936,234 | A | | 8/1999 | Thomas | |
| 5,961,573 | A | | 10/1999 | Hale | |
| 5,975,283 | A | | 11/1999 | Riffe | |
| 6,003,455 | A | | 12/1999 | Flamme | |
| 6,013,020 | A | | 1/2000 | Meloul | |
| 6,068,063 | A | | 5/2000 | Mayerle | |
| 6,068,064 | A | | 5/2000 | Bettin | |
| 6,091,997 | A | | 7/2000 | Flamme | |
| 6,116,172 | A | | 9/2000 | Prairie | |
| 6,119,608 | A | | 9/2000 | Peterson | |
| 6,142,086 | A | | 11/2000 | Richard | |
| 6,260,632 | B1 | | 7/2001 | Bourgault et al. | |
| 6,269,758 | B1 | | 8/2001 | Sauder | |
| 6,293,438 | B1 | | 9/2001 | Woodruff | |
| 6,325,156 | B1 | | 12/2001 | Barry | |
| 6,352,042 | B1 | | 3/2002 | Martin | |
| 6,378,619 | B2 | | 4/2002 | Mayerle | |
| 6,389,999 | B1 | | 5/2002 | Duello | |
| 6,460,623 | B1 | | 10/2002 | Knussman | |
| 6,516,733 | B1 | | 2/2003 | Sauder | |
| 6,640,731 | B1 | | 11/2003 | Rowlett | |
| 6,651,570 | B1 | | 11/2003 | Thiemke | |
| 6,681,706 | B2 | | 1/2004 | Sauder et al. | |
| 6,701,857 | B1 | | 3/2004 | Jensen | |
| 6,718,892 | B1 | | 4/2004 | Rosenboom | |
| 6,748,885 | B2 | | 6/2004 | Sauder et al. | |
| 6,752,095 | B1 | | 6/2004 | Rylander et al. | |
| 6,827,029 | B1 | | 12/2004 | Wendte | |
| 6,863,006 | B2 | | 3/2005 | Sandoval | |
| 7,004,090 | B2 | | 2/2006 | Swanson | |
| 7,131,384 | B2 | | 11/2006 | Kester | |
| 7,263,937 | B2 | | 9/2007 | Frasier | |
| 7,334,532 | B2 | | 2/2008 | Sauder et al. | |
| 7,395,767 | B2 | | 7/2008 | Sulman | |
| 7,395,769 | B2 | | 7/2008 | Jensen | |
| 7,404,366 | B2 | | 7/2008 | Mariman | |
| 7,448,334 | B2 | | 11/2008 | Mariman | |
| 7,478,603 | B2 | | 1/2009 | Riewerts | |
| 7,490,565 | B2 | | 2/2009 | Holly | |
| 7,493,836 | B2 | | 2/2009 | Wolfer | |
| 7,540,246 | B2 | | 6/2009 | Friesen | |
| 7,581,684 | B2 | | 9/2009 | des Garennes et al. | |
| 7,584,707 | B2 | | 9/2009 | Sauder | |
| 7,661,377 | B2 | | 2/2010 | Keaton | |
| 7,673,570 | B1 | | 3/2010 | Bassett | |
| 7,694,638 | B1 | | 4/2010 | Riewerts | |

(56) References Cited

U.S. PATENT DOCUMENTS

| | | | |
|---|---|---|---|
| 7,699,009 | B2 | 4/2010 | Sauder et al. |
| 7,717,048 | B2 | 5/2010 | Peterson, Jr. et al. |
| 7,854,206 | B2 | 12/2010 | Horsch |
| 7,870,826 | B2 | 1/2011 | Bourgault |
| 7,918,168 | B2 | 4/2011 | Garner et al. |
| 7,938,074 | B2 | 5/2011 | Liu |
| 7,980,186 | B2 | 7/2011 | Henry |
| 8,020,657 | B2 | 9/2011 | Allard |
| 8,056,465 | B2 | 11/2011 | Carlz |
| 8,074,586 | B2 | 12/2011 | Garner et al. |
| 8,078,367 | B2 | 12/2011 | Sauder |
| 8,201,507 | B2 | 6/2012 | Sauder |
| 8,275,525 | B2 | 9/2012 | Kowalchuk |
| 8,275,627 | B2 | 9/2012 | Henning |
| 8,276,529 | B2 | 10/2012 | Garner et al. |
| 8,286,566 | B2 | 10/2012 | schilling |
| 8,322,293 | B2 | 12/2012 | Wollenhaupt et al. |
| 8,336,471 | B2 | 12/2012 | Gilstring |
| 8,342,258 | B2 | 1/2013 | Ryder |
| 8,346,442 | B2 | 1/2013 | Ryder |
| 8,371,239 | B2 | 2/2013 | Rans et al. |
| 8,375,873 | B2 | 2/2013 | Nelson et al. |
| 8,375,874 | B2 | 2/2013 | Peterson |
| 8,418,636 | B2 | 4/2013 | Liu et al. |
| 8,430,179 | B2 | 4/2013 | Van Buskirk |
| 8,443,742 | B2 | 5/2013 | Orrenius |
| 8,448,585 | B2 | 5/2013 | Wilhelmi et al. |
| 8,448,587 | B2 | 5/2013 | Kowalchuk |
| 8,448,717 | B2 | 5/2013 | Adams et al. |
| 8,451,449 | B2 | 5/2013 | Holland |
| 8,468,960 | B2 | 6/2013 | Garner et al. |
| 8,479,671 | B2 | 7/2013 | Shoup |
| 8,522,699 | B2 | 9/2013 | Garner et al. |
| 8,522,889 | B2 | 9/2013 | Adams et al. |
| 8,544,395 | B2 | 10/2013 | Dietrich, Sr. |
| 8,544,397 | B2 | 10/2013 | Bassett |
| 8,544,398 | B2 | 10/2013 | Bassett |
| 8,550,020 | B2 | 10/2013 | Sauder et al. |
| 8,561,472 | B2 | 10/2013 | Sauder et al. |
| 8,573,111 | B2 | 11/2013 | Graham |
| 8,634,992 | B2 | 1/2014 | Sauder et al. |
| 8,636,077 | B2 | 1/2014 | Bassett |
| 8,671,856 | B2 | 3/2014 | Garner et al. |
| 8,677,914 | B2 | 3/2014 | Stark |
| 8,746,159 | B2 | 6/2014 | Garner et al. |
| 8,755,049 | B2 | 6/2014 | Holland |
| 8,763,713 | B2 | 7/2014 | Bassett |
| 8,770,308 | B2 | 7/2014 | Bassett |
| 8,776,702 | B2 | 7/2014 | Bassett |
| 8,789,482 | B2 | 7/2014 | Garner et al. |
| 8,789,483 | B2 | 7/2014 | Gilstring |
| RE45,091 | E | 8/2014 | Bassett |
| 8,800,457 | B2 | 8/2014 | Garner et al. |
| 8,813,663 | B2 | 8/2014 | Garner et al. |
| 8,814,474 | B2 | 8/2014 | bell |
| 8,850,995 | B2 | 10/2014 | Garner |
| 8,850,998 | B2 | 10/2014 | Garner |
| 8,863,857 | B2 | 10/2014 | Bassett |
| 8,903,545 | B2 * | 12/2014 | Riffel .................... A01B 63/32 700/242 |
| 8,909,436 | B2 | 12/2014 | Achen |
| 8,910,582 | B2 | 12/2014 | Mariman et al. |
| 8,924,092 | B2 | 12/2014 | Achen |
| 8,924,102 | B2 | 12/2014 | Sauder et al. |
| 8,942,896 | B2 | 1/2015 | Mayerle |
| RE45,412 | E | 3/2015 | Sauder et al. |
| 8,978,564 | B2 | 3/2015 | Hagny |
| 8,985,037 | B2 | 3/2015 | Radtke |
| 8,985,232 | B2 | 3/2015 | Bassett |
| 9,055,712 | B2 | 6/2015 | Bassett |
| 9,107,337 | B2 | 8/2015 | Bassett |
| 9,107,338 | B2 | 8/2015 | Bassett |
| 9,113,589 | B2 | 8/2015 | Bassett |
| 9,119,342 | B2 | 9/2015 | Bonefas |
| 9,137,938 | B2 | 9/2015 | Zimmerman |
| 9,137,941 | B2 | 9/2015 | Stark |
| 9,144,187 | B2 | 9/2015 | Bassett |
| 9,144,189 | B2 | 9/2015 | Stoller |
| 9,148,992 | B2 | 10/2015 | Staeter |
| 9,151,388 | B2 | 10/2015 | Gilstring |
| 9,167,740 | B2 | 10/2015 | Bassett |
| 9,173,339 | B2 | 11/2015 | Sauder et al. |
| 9,192,089 | B2 | 11/2015 | Bassett |
| 9,213,905 | B2 | 12/2015 | Lange |
| 9,226,440 | B2 | 1/2016 | Bassett |
| 9,232,687 | B2 | 1/2016 | Bassett |
| 9,265,191 | B2 | 2/2016 | Sauder et al. |
| 9,277,688 | B2 | 3/2016 | Wilhelmi |
| 9,282,691 | B2 | 3/2016 | Wilhelmi |
| 9,282,692 | B2 | 3/2016 | Wilhelmi |
| 9,288,937 | B2 | 3/2016 | Sauder et al. |
| 9,301,438 | B2 | 4/2016 | Sauder et al. |
| 9,313,941 | B2 | 4/2016 | Garner et al. |
| 9,313,942 | B2 | 4/2016 | Wilhelmi |
| 9,332,689 | B2 | 5/2016 | Baurer |
| 9,338,937 | B2 | 5/2016 | Sauder et al. |
| 9,345,188 | B2 | 5/2016 | Garner et al. |
| 9,351,440 | B2 | 5/2016 | Sauder et al. |
| 9,426,940 | B2 | 8/2016 | Connors et al. |
| 9,433,141 | B2 | 9/2016 | Friestad et al. |
| 9,462,744 | B2 | 10/2016 | Isaacson |
| 9,480,199 | B2 | 11/2016 | Garner et al. |
| 9,485,900 | B2 | 11/2016 | Connell |
| 9,491,901 | B2 | 11/2016 | Gentili |
| 9,510,498 | B2 | 12/2016 | Tuttle et al. |
| 9,510,502 | B2 | 12/2016 | Garner et al. |
| 9,523,496 | B2 | 12/2016 | Bingham |
| 9,532,496 | B2 | 1/2017 | Sauder et al. |
| 9,554,504 | B2 | 1/2017 | Houck |
| 9,578,802 | B2 | 2/2017 | Radtke |
| 9,585,301 | B1 | 3/2017 | Lund |
| 9,603,298 | B2 | 3/2017 | Wendte et al. |
| 9,622,402 | B2 | 4/2017 | Kinzenbaw et al. |
| 9,629,301 | B2 | 4/2017 | Gentili |
| 9,629,302 | B2 | 4/2017 | Gentili |
| 9,629,304 | B2 | 4/2017 | Zielke |
| 9,661,799 | B2 | 5/2017 | Garner et al. |
| 9,668,402 | B2 | 6/2017 | Hagny |
| 9,675,002 | B2 | 6/2017 | Roszman |
| 9,675,004 | B2 | 6/2017 | Landphair et al. |
| 9,681,601 | B2 | 6/2017 | Bassett |
| 9,686,906 | B2 | 6/2017 | Garner et al. |
| 9,693,496 | B2 | 7/2017 | Tevs |
| 9,693,498 | B2 | 7/2017 | Zumdome |
| 9,699,955 | B2 | 7/2017 | Garner et al. |
| 9,699,958 | B2 | 7/2017 | Koch |
| 9,706,702 | B2 | 7/2017 | Wendte et al. |
| 9,723,778 | B2 | 8/2017 | Bassett |
| 9,730,379 | B2 | 8/2017 | Wendte |
| 9,733,634 | B2 | 8/2017 | Prickel |
| 9,746,007 | B1 | 8/2017 | stoller |
| 9,750,174 | B2 | 9/2017 | Sauder et al. |
| 9,752,596 | B2 | 9/2017 | Sauder |
| 9,756,779 | B2 | 9/2017 | Wilhelmi |
| 9,769,978 | B2 | 9/2017 | Radtke |
| 9,788,472 | B2 | 10/2017 | Bassett |
| 9,801,332 | B2 | 10/2017 | Landphair |
| 9,807,921 | B2 | 11/2017 | Levy et al. |
| 9,807,922 | B2 | 11/2017 | Garner et al. |
| 9,807,924 | B2 | 11/2017 | Garner et al. |
| 9,814,172 | B2 | 11/2017 | Achen et al. |
| 9,814,176 | B2 | 11/2017 | Kowalchuk |
| 9,820,427 | B2 | 11/2017 | Hagny |
| 9,820,429 | B2 | 11/2017 | Garner et al. |
| 9,832,924 | B2 | 12/2017 | Anderson |
| 9,848,522 | B2 | 12/2017 | Bassett |
| 9,848,523 | B2 | 12/2017 | Sauder |
| 9,854,733 | B1 | 1/2018 | Kile |
| 9,861,025 | B2 | 1/2018 | Schaefer et al. |
| 9,861,031 | B2 | 1/2018 | Garner et al. |
| 9,872,424 | B2 | 1/2018 | Baurer et al. |
| 9,879,702 | B2 | 1/2018 | stoller |
| 9,936,627 | B2 | 4/2018 | Wilhelmi et al. |
| 9,936,628 | B2 | 4/2018 | Wilhelmi et al. |

(56) References Cited

U.S. PATENT DOCUMENTS

| | | | |
|---|---|---|---|
| 9,949,426 | B2 | 4/2018 | Radtke |
| 9,955,623 | B2 | 5/2018 | Sauder et al. |
| 9,968,033 | B2 | 5/2018 | Dunn |
| 9,980,426 | B2 | 5/2018 | Wilhelmi et al. |
| 10,004,173 | B2 | 6/2018 | Garner et al. |
| 10,010,024 | B2 | 7/2018 | Pirkenseer et al. |
| 10,045,477 | B2 | 8/2018 | Hagny |
| 10,051,782 | B2 | 8/2018 | Wilhelmi et al. |
| 10,064,322 | B2 | 9/2018 | Luc |
| 10,091,926 | B2 | 10/2018 | Maro |
| 10,104,830 | B2 | 10/2018 | Heathcote |
| 10,104,832 | B2 | 10/2018 | Wilhelmi et al. |
| 10,111,415 | B2 | 10/2018 | Kolb |
| 10,143,128 | B2 | 12/2018 | Landphair et al. |
| 10,154,623 | B2 | 12/2018 | Wilhelmi et al. |
| 10,206,326 | B2 | 2/2019 | Garner et al. |
| 10,231,376 | B1 | 3/2019 | Stanhope |
| 10,257,973 | B2 | 4/2019 | Hubner |
| 10,299,425 | B2 | 5/2019 | Sauder et al. |
| 10,398,077 | B2 | 9/2019 | Radtke |
| 10,408,670 | B2 | 9/2019 | Holcomb |
| 10,470,358 | B2 | 11/2019 | Sauder et al. |
| 10,485,159 | B2 | 11/2019 | Wilhelmi et al. |
| 10,548,259 | B2 | 2/2020 | Heathcote |
| 10,609,857 | B2 | 4/2020 | Sauder |
| 10,645,865 | B2 | 5/2020 | Bassett |
| 10,729,063 | B2 | 8/2020 | Garner et al. |
| 10,743,460 | B2 | 8/2020 | Gilbert |
| 10,806,070 | B2 | 10/2020 | Garner et al. |
| 10,821,829 | B2 | 11/2020 | Foster |
| 10,959,369 | B2 | 3/2021 | Sieling |
| RE48,572 | E | 6/2021 | Garner |
| 11,051,445 | B2 | 7/2021 | Hubner |
| 11,058,048 | B2 | 7/2021 | Radtke |
| 11,144,775 | B2 | 10/2021 | Ferrari |
| 11,197,411 | B2 | 12/2021 | Bassett |
| 11,202,404 | B2 | 12/2021 | Walter |
| 11,212,954 | B2 | 1/2022 | Maeder |
| 11,277,961 | B2 | 3/2022 | Campbell |
| 11,523,554 | B2 | 12/2022 | Buehler |
| 11,612,096 | B2 | 3/2023 | Sivinski |
| 11,622,494 | B2 | 4/2023 | Arnett et al. |
| 11,672,195 | B2 | 6/2023 | Stoller |
| 11,730,079 | B2 | 8/2023 | Wilhelmi |
| 11,785,881 | B2 | 10/2023 | Buehler |
| 11,818,977 | B2 | 11/2023 | Anderson |
| 11,877,530 | B2 | 1/2024 | Barry |
| 11,997,939 | B2 | 6/2024 | Gilbert |
| 12,075,719 | B2 | 9/2024 | Strnad |
| 12,158,388 | B2 | 12/2024 | Yelle |
| 2002/0056407 | A1 | 5/2002 | Milne |
| 2002/0073678 | A1 | 6/2002 | Lucand |
| 2003/0005867 | A1 | 1/2003 | Richard |
| 2003/0183141 | A1 | 10/2003 | Bergere et al. |
| 2004/0139895 | A1 | 7/2004 | Thompson et al. |
| 2005/0103244 | A1 | 5/2005 | Mayerle |
| 2005/0155536 | A1 | 7/2005 | Wendte |
| 2005/0172873 | A1 | 8/2005 | Mayerle |
| 2005/0263049 | A1 | 12/2005 | Summach |
| 2006/0086295 | A1 | 4/2006 | Jensen |
| 2008/0110382 | A1 | 5/2008 | Brockmeier |
| 2008/0229986 | A1 | 9/2008 | Arksey |
| 2008/0257237 | A1 | 10/2008 | Friesen |
| 2009/0056531 | A1 | 3/2009 | Jessen |
| 2009/0056537 | A1 | 3/2009 | Jessen |
| 2009/0112410 | A1 | 4/2009 | Shull |
| 2010/0180808 | A1 | 7/2010 | Liu |
| 2010/0192818 | A1 | 8/2010 | Garner |
| 2010/0224110 | A1 | 9/2010 | Mariman |
| 2010/0270043 | A1 | 10/2010 | Ankenman |
| 2010/0319941 | A1 | 12/2010 | Peterson |
| 2011/0027479 | A1 | 2/2011 | Reineccius |
| 2011/0028214 | A1 | 2/2011 | Bright et al. |
| 2011/0162566 | A1 | 7/2011 | Willhelmi et al. |
| 2011/0271887 | A1 | 11/2011 | Shoup |
| 2011/0313575 | A1 | 12/2011 | Kowalchuk |
| 2012/0042813 | A1 | 2/2012 | Liu et al. |
| 2012/0046838 | A1 | 2/2012 | Landphair et al. |
| 2012/0048159 | A1 | 3/2012 | Adams et al. |
| 2012/0048160 | A1 | 3/2012 | Adams |
| 2012/0151910 | A1 | 6/2012 | Sauder |
| 2012/0186503 | A1 | 7/2012 | Sauder |
| 2012/0261149 | A1 | 10/2012 | Schmidt |
| 2012/0291680 | A1 | 11/2012 | Rylander |
| 2013/0032363 | A1 | 2/2013 | Curry et al. |
| 2013/0126430 | A1 | 5/2013 | kenley |
| 2013/0248212 | A1 | 9/2013 | Bassett |
| 2013/0333601 | A1 | 12/2013 | Shivak |
| 2014/0026748 | A1 | 1/2014 | Stoller |
| 2014/0033972 | A1 | 2/2014 | Meyer |
| 2014/0060869 | A1 | 3/2014 | Blunier |
| 2014/0109808 | A1 | 4/2014 | Schilling |
| 2014/0116735 | A1 | 5/2014 | Bassett |
| 2014/0190712 | A1 | 7/2014 | Bassett |
| 2014/0214284 | A1 | 7/2014 | Sauder et al. |
| 2014/0216771 | A1 | 8/2014 | Bassett |
| 2014/0230705 | A1 | 8/2014 | Radtke |
| 2014/0238284 | A1 | 8/2014 | Kapphahn |
| 2014/0262378 | A1 | 9/2014 | Connors |
| 2014/0277959 | A1 | 9/2014 | Wagers |
| 2014/0303854 | A1 | 10/2014 | Zielke |
| 2014/0379230 | A1 | 12/2014 | Koch |
| 2015/0094916 | A1 | 4/2015 | Bauerer et al. |
| 2015/0107501 | A1 | 4/2015 | Barton |
| 2015/0176614 | A1 | 6/2015 | Stoller |
| 2015/0195988 | A1 | 7/2015 | Radtke |
| 2015/0201549 | A1 | 7/2015 | Baurer |
| 2015/0223391 | A1 | 8/2015 | Wendte |
| 2015/0223392 | A1 | 8/2015 | Wilhelmi et al. |
| 2015/0264857 | A1 | 9/2015 | Achen |
| 2015/0271986 | A1 | 10/2015 | Sauder |
| 2015/0289441 | A1 | 10/2015 | Arnett |
| 2015/0289442 | A1 | 10/2015 | Heilman |
| 2015/0305229 | A1 | 10/2015 | Sauder |
| 2015/0319919 | A1 | 11/2015 | Sauder |
| 2015/0351315 | A1 | 12/2015 | Wendte |
| 2016/0007521 | A1 | 1/2016 | Kusler |
| 2016/0007524 | A1 | 1/2016 | kusler |
| 2016/0040692 | A1 | 2/2016 | Stoller |
| 2016/0128269 | A1 | 5/2016 | Helmick |
| 2016/0128272 | A1 | 5/2016 | Sauder |
| 2016/0143213 | A1 | 5/2016 | Kowalchuk |
| 2016/0157412 | A1 | 6/2016 | Sauder |
| 2016/0212932 | A1 | 7/2016 | Radtke |
| 2016/0227700 | A1 | 8/2016 | Wendte |
| 2016/0227701 | A1 | 8/2016 | Nelson |
| 2016/0249525 | A1 | 9/2016 | Baurer et al. |
| 2017/0000016 | A1 | 1/2017 | Prickel |
| 2017/0013771 | A1 | 1/2017 | townsend |
| 2017/0020058 | A1 | 1/2017 | Pirkenseer et al. |
| 2017/0034995 | A1 | 2/2017 | Wilhelmi |
| 2017/0049044 | A1 | 2/2017 | Stoller |
| 2017/0086347 | A1 | 3/2017 | Sauder |
| 2017/0094889 | A1 | 4/2017 | Garner |
| 2017/0094894 | A1 | 4/2017 | Heim |
| 2017/0112043 | A1 | 4/2017 | Nair |
| 2017/0127604 | A1 | 5/2017 | Wilhelmi |
| 2017/0223947 | A1 | 8/2017 | Gall |
| 2017/0280616 | A1 | 10/2017 | Gervais |
| 2017/0332546 | A1 | 11/2017 | Garner et al. |
| 2017/0354079 | A1 | 12/2017 | Foster |
| 2017/0357029 | A1 | 12/2017 | Lakshmanan |
| 2017/0359941 | A1 | 12/2017 | Czapka |
| 2017/0359949 | A1 | 12/2017 | Garner et al. |
| 2017/0367252 | A1 | 12/2017 | Sakaguchi |
| 2017/0367255 | A1 | 12/2017 | Wilhelmi et al. |
| 2018/0007824 | A1 | 1/2018 | Radtke |
| 2018/0015490 | A1 | 1/2018 | grimm |
| 2018/0024549 | A1 | 1/2018 | Hurd |
| 2018/0092287 | A1 | 4/2018 | Garner |
| 2018/0092288 | A1 | 4/2018 | Garner |
| 2018/0092289 | A1 | 4/2018 | Wonderlich |
| 2018/0092295 | A1 | 4/2018 | Sugumaran |
| 2018/0125000 | A1 | 5/2018 | Levy |

(56) References Cited

U.S. PATENT DOCUMENTS

| | | | |
|---|---|---|---|
| 2018/0128933 | A1 | 5/2018 | Koch |
| 2018/0132422 | A1 | 5/2018 | Hassanzadeh et al. |
| 2018/0132423 | A1 | 5/2018 | Rowan |
| 2018/0168094 | A1 | 6/2018 | Koch |
| 2018/0199499 | A1 | 7/2018 | Adams |
| 2018/0199505 | A1 | 7/2018 | Beaujot |
| 2018/0206393 | A1 | 7/2018 | Stoller |
| 2018/0210443 | A1 | 7/2018 | Matsuzaki |
| 2018/0249624 | A1 | 9/2018 | Gentili |
| 2018/0263174 | A1 | 9/2018 | Hodel |
| 2018/0292339 | A1 | 10/2018 | Gunzenhauser |
| 2018/0317380 | A1 | 11/2018 | Bassett |
| 2018/0317381 | A1 | 11/2018 | Bassett |
| 2018/0368310 | A1 | 12/2018 | Zimmerman |
| 2018/0373264 | A1 | 12/2018 | Madsen |
| 2019/0021211 | A1 | 1/2019 | Gutknecht |
| 2019/0029165 | A1 | 1/2019 | Leimkuehler et al. |
| 2019/0045703 | A1 | 2/2019 | Bassett |
| 2019/0059206 | A1 | 2/2019 | Stanhope |
| 2019/0072114 | A1 | 3/2019 | Myers et al. |
| 2019/0075714 | A1 | 3/2019 | Koch |
| 2019/0098828 | A1 | 4/2019 | Wilhelmi |
| 2019/0124824 | A1 | 5/2019 | Hubner |
| 2019/0162164 | A1 | 5/2019 | Funk |
| 2019/0174666 | A1 | 6/2019 | Mantemach |
| 2019/0191622 | A1 | 6/2019 | Hafvenstein |
| 2019/0232304 | A1 | 8/2019 | Grimm |
| 2019/0239413 | A1 | 8/2019 | DeGarmo |
| 2019/0254223 | A1 | 8/2019 | Eichhorn |
| 2019/0286915 | A1 | 9/2019 | Patil |
| 2019/0289778 | A1 | 9/2019 | Koch |
| 2019/0297769 | A1 | 10/2019 | Zielke et al. |
| 2019/0297774 | A1 | 10/2019 | Hamilton |
| 2019/0302799 | A1 | 10/2019 | Schaff |
| 2019/0373801 | A1 | 12/2019 | Schoeny |
| 2019/0380259 | A1 | 12/2019 | Frank |
| 2019/0387662 | A1 | 12/2019 | Viriat |
| 2020/0029486 | A1 | 1/2020 | Buehler et al. |
| 2020/0045869 | A1 | 2/2020 | Stanhope |
| 2020/0053954 | A1 | 2/2020 | Hamilton |
| 2020/0068778 | A1 | 3/2020 | Schoeny |
| 2020/0068783 | A1 | 3/2020 | Strnad |
| 2020/0084951 | A1 | 3/2020 | Fanshier |
| 2020/0100418 | A1 | 4/2020 | Komecki |
| 2020/0100419 | A1 | 4/2020 | Stanhope |
| 2020/0100421 | A1 | 4/2020 | Wang |
| 2020/0100423 | A1 | 4/2020 | Dienst |
| 2020/0109954 | A1 | 4/2020 | Li |
| 2020/0128723 | A1 | 4/2020 | Eichhorn |
| 2020/0154627 | A1 | 5/2020 | Plattner |
| 2020/0154629 | A1 | 5/2020 | Holoubek et al. |
| 2020/0178455 | A1 | 6/2020 | Ishikawa |
| 2020/0217044 | A1 | 7/2020 | Martel |
| 2020/0221630 | A1 | 7/2020 | Pomedli |
| 2020/0296882 | A1 | 9/2020 | Madison |
| 2020/0305335 | A1 | 10/2020 | Schoeny |
| 2020/0329631 | A1 | 10/2020 | Johnson |
| 2020/0337218 | A1 | 10/2020 | Puhalla |
| 2020/0352088 | A1 | 11/2020 | Arnett et al. |
| 2020/0359559 | A1 | 11/2020 | Koch |
| 2020/0375081 | A1 | 12/2020 | Holoubek |
| 2020/0375085 | A1 | 12/2020 | Strnad |
| 2020/0375090 | A1 | 12/2020 | Morgan |
| 2021/0022286 | A1 | 1/2021 | Gilbert et al. |
| 2021/0037699 | A1 | 2/2021 | Wilhelmi |
| 2021/0051846 | A1 | 2/2021 | Vandenbark |
| 2021/0059102 | A1 | 3/2021 | Geistkemper |
| 2021/0120726 | A1 | 4/2021 | Barrick |
| 2021/0132618 | A1 | 5/2021 | Van Roekel |
| 2021/0153421 | A1 | 5/2021 | Holoubek et al. |
| 2021/0161060 | A1 | 6/2021 | Kaufmann |
| 2021/0185903 | A1 | 6/2021 | Demiter |
| 2021/0212252 | A1 | 7/2021 | Wilhelmi |
| 2021/0235611 | A1 | 8/2021 | Fett |
| 2021/0243939 | A1 | 8/2021 | Strnad |
| 2021/0243941 | A1 | 8/2021 | Buehler |
| 2021/0289707 | A1 | 9/2021 | Schloesser |
| 2021/0307236 | A1 | 10/2021 | Strnad et al. |
| 2021/0315147 | A1 | 10/2021 | Fanshier |
| 2021/0329838 | A1 | 10/2021 | Zielke |
| 2022/0000008 | A1 | 1/2022 | Hubner et al. |
| 2022/0061202 | A1 | 3/2022 | Holoubek et al. |
| 2022/0061208 | A1 | 3/2022 | Campbell |
| 2022/0142039 | A1 | 5/2022 | Eichhorn et al. |
| 2022/0142041 | A1 | 5/2022 | Johnson |
| 2022/0151138 | A1 | 5/2022 | Barry |
| 2022/0174855 | A1 | 6/2022 | Zielke et al. |
| 2022/0192080 | A1 | 6/2022 | Goza |
| 2022/0232753 | A1 | 7/2022 | Van De Woestyne et al. |
| 2022/0272888 | A1 | 9/2022 | Hodel |
| 2022/0369534 | A1 | 11/2022 | Nikolakakis |
| 2023/0105245 | A1 | 4/2023 | Buehler |
| 2023/0145955 | A1 | 5/2023 | Schmidt et al. |
| 2023/0180653 | A1 | 6/2023 | Barry |
| 2023/0232732 | A1 | 7/2023 | Hartogh |
| 2023/0232733 | A1 | 7/2023 | Barry |
| 2023/0270039 | A1 | 8/2023 | Fanshier |
| 2023/0388458 | A1 | 11/2023 | Eichhorn et al. |
| 2023/0413720 | A1 | 12/2023 | Barry |
| 2024/0032455 | A1 | 2/2024 | Buehler |
| 2024/0040955 | A1 | 2/2024 | Barry |
| 2024/0167848 | A1 | 5/2024 | Johnson |
| 2024/0180066 | A1 | 6/2024 | Holoubek |
| 2024/0315163 | A1 | 9/2024 | Gilbert |
| 2024/0334864 | A1 | 10/2024 | Holoubek et al. |
| 2025/0133977 | A1 | 5/2025 | Barry et al. |
| 2025/0348988 | A1 | 11/2025 | Eichhorn |
| 2026/0056032 | A1 | 2/2026 | Roe |

FOREIGN PATENT DOCUMENTS

| | | | |
|---|---|---|---|
| AU | 2017382800 | B2 | 6/2018 |
| AU | 2018100865 | B4 | 6/2022 |
| BR | 102015003633 | B1 | 12/2015 |
| BR | 102016002919 | B1 | 8/2016 |
| BR | 102015003633 | | 2/2021 |
| BR | 102016002919 | | 2/2021 |
| CA | 1218266 | | 2/1987 |
| CA | 1218266 | A | 2/1987 |
| CA | 2346724 | A1 | 4/2000 |
| CA | 2408684 | A1 | 12/2001 |
| CA | 2213350 | C | 7/2002 |
| CA | 2213354 | | 7/2002 |
| CA | 2213354 | C | 7/2002 |
| CA | 2213703 | | 7/2002 |
| CA | 2213703 | C | 7/2002 |
| CA | 2213350 | | 9/2002 |
| CA | 2549371 | A1 | 11/2007 |
| CA | 2584736 | A1 | 9/2008 |
| CA | 2727188 | A1 | 12/2009 |
| CA | 2830627 | C | 9/2012 |
| CA | 2915844 | C | 12/2015 |
| CA | 2923713 | | 12/2016 |
| CA | 2923713 | A1 | 12/2016 |
| CA | 2830627 | | 5/2019 |
| CA | 2915844 | | 4/2020 |
| CN | 201057704 | Y | 5/2008 |
| CN | 206380282 | U | 8/2017 |
| CN | 108362267 | A | 8/2018 |
| CN | 109463081 | A | 3/2019 |
| CN | 110667889 | A | 1/2020 |
| CN | 112601450 | A | 4/2021 |
| DE | 389840 | | 2/1924 |
| DE | 389840 | C | 2/1924 |
| DE | 2011462 | | 9/1971 |
| DE | 2011462 | A1 | 9/1971 |
| DE | 2826658 | | 4/1981 |
| DE | 2826658 | A1 | 4/1981 |
| DE | 8400142 | | 5/1984 |
| DE | 8400142 | U1 | 5/1984 |
| DE | 3405031 | | 4/1985 |
| DE | 3405031 | C1 | 4/1985 |
| DE | 3826397 | A1 | 1/1989 |
| DE | 202005007450 | U1 | 7/2005 |

(56) References Cited

FOREIGN PATENT DOCUMENTS

| | | | | |
|---|---|---|---|---|
| DE | 102017118594 A1 | | 2/2019 | |
| EP | 47577 A3 | | 3/1982 | |
| EP | 152048 A2 | | 8/1985 | |
| EP | 0152048 | | 5/1986 | |
| EP | 182220 B1 | | 5/1986 | |
| EP | 0182220 | | 4/1990 | |
| EP | 372901 A2 | | 6/1990 | |
| EP | 606541 A1 | | 7/1994 | |
| EP | 0606541 | | 1/1997 | |
| EP | 1461989 A1 | | 9/2004 | |
| EP | 2688384 | | 1/2014 | |
| EP | 2832203 B1 | | 2/2015 | |
| EP | 2911497 | | 2/2015 | |
| EP | 2911499 | | 2/2015 | |
| EP | 1461989 | | 5/2015 | |
| EP | 2911497 B1 | | 10/2016 | |
| EP | 2911499 B1 | | 10/2016 | |
| EP | 3108731 | | 12/2016 | |
| EP | 3108731 A8 | | 12/2016 | |
| EP | 2688384 B1 | | 6/2017 | |
| EP | 3219186 A1 | | 9/2017 | |
| EP | 2901838 B1 | | 11/2017 | |
| EP | 3698615 A1 | | 8/2020 | |
| EP | 3753388 A2 | | 12/2020 | |
| FR | 1229027 A | | 9/1960 | |
| FR | 1503687 | | 12/1967 | |
| FR | 1503687 A | | 12/1967 | |
| FR | 2414288 | | 8/1979 | |
| FR | 2414288 A1 | | 8/1979 | |
| FR | 2490064 A1 | | 3/1982 | |
| FR | 2591061 | | 6/1986 | |
| FR | 2591061 A1 | | 6/1986 | |
| FR | 2574243 | | 6/1987 | |
| FR | 2574243 A1 | | 6/1987 | |
| FR | 2678472 A1 | | 1/1993 | |
| GB | 18381 | | 10/1904 | |
| GB | 18381 A | | 10/1904 | |
| GB | 482789 | | 4/1937 | |
| GB | 482789 A | | 4/1938 | |
| GB | 989145 | | 4/1965 | |
| GB | 989145 A | | 4/1965 | |
| GB | 1136771 A | | 12/1968 | |
| GB | 2012534 | | 8/1979 | |
| GB | 2057835 | | 4/1981 | |
| GB | 2057835 A | | 4/1981 | |
| GB | 2012534 A | | 1/1982 | |
| GB | 2309622 A | | 6/1997 | |
| JP | 562481 | | 3/1981 | |
| JP | S56-24815 U | | 3/1981 | |
| JP | H11-59886 A | | 3/1999 | |
| JP | H1159886 | | 3/1999 | |
| JP | 2007117941 | | 5/2007 | |
| JP | 2007117941 A | | 5/2007 | |
| JP | 4517467 B2 | | 8/2010 | |
| KR | 20040029905 A | * | 4/2004 | ........... A01C 11/006 |
| KR | 20080044756 A | * | 5/2008 | ........... A01C 15/006 |
| KR | 101728137 B1 | | 4/2017 | |
| NL | 1005451 | | 9/1998 | |
| NL | 1005451 C2 | | 9/1998 | |
| RU | 2355152 C2 | | 5/2009 | |
| SU | 948316 | | 8/1982 | |
| SU | 948316 A1 | | 8/1982 | |
| SU | 1148582 A | | 4/1985 | |
| SU | 1148582 A1 | | 4/1985 | |
| WO | 9716954 A1 | | 5/1997 | |
| WO | 1998/049884 A1 | | 11/1998 | |
| WO | 9849884 | | 11/1998 | |
| WO | 2005/011358 A1 | | 2/2005 | |
| WO | 2005011358 | | 2/2005 | |
| WO | 2009134144 A1 | | 11/2009 | |
| WO | 2010059101 | | 5/2010 | |
| WO | 2010124360 | | 11/2010 | |
| WO | 2013130003 | | 9/2013 | |
| WO | 2014153157 A1 | | 9/2014 | |
| WO | 2015171908 A1 | | 11/2015 | |
| WO | 2017160860 A1 | | 9/2017 | |
| WO | 2017197274 A1 | | 11/2017 | |
| WO | 2017197292 A1 | | 11/2017 | |
| WO | 2018151989 A1 | | 8/2018 | |
| WO | 2020012369 A3 | | 1/2020 | |
| WO | 2020049467 A1 | | 3/2020 | |
| WO | 2021021594 A1 | | 2/2021 | |
| WO | 2021231159 A1 | | 11/2021 | |

OTHER PUBLICATIONS

Boss 18 Metre Parallelogram Tyne Planter—https://www.thecombineforum.com/threads/boss-18-metre-parallelogram-tyne-planter-on-9-spacing.222722/.
Contour King Gallery—ZML.
Dawn ACS Explanation video, https://twitter.com/DawnEquipment/status/969698839409111045.
Enfield Technologies, EQV Proportional Pinch Valves, https://www.enfieldtech.com/Products/EQV-Proportional-Pinch-Valves.
Farm Equipment—ZML.
Ground Breaker Precision Planters and Patented Tyne and Disc Row Units—https://www.precisionagsolutions.com.au/ground-breaker.
Janke Australia, available as early as 2017—https://www.janke.com.au/.
Kasper, relationship between six years of corn yields and terrain attributes, ISU—Kaspar, Tom & Colvin, Thomas & Jaynes, D.B. & Karlen, Douglas & James, David & Meek, David & Pulido, Daniel & Butler, Howard. (2003). Relationship Between Six Years of Corn Yields and Terrain Attributes. Precision Agriculture. 4. 87-101.
Manitoba, design of a spring-loaded downforce system for a no-till seed opener, 2003.
Modular Row Crop Planting Systems from Excel Agriculture, available as early as 2002—https://www.excelagr.com.au/excel-agri-row-crop-planter.php.
Orthman ItRIPr row unit, 2019.
Parallelogram Tyne Units—https://bossagriculture.com.au/home/planter-row-units/parallelogram-tyne-units/.
Patriot Parallelogram Tyne Planter Farm Equipment Gessner, available as early as 2017—https://www.gessner.com.au/products/patriot-parallelogram-tyne-planter/.
Precision Planting 2010 Full Line Brochure.
Fundamentals of Machine Operation—Planting, Deere & Co. (Breece et al 1975).
John Deere 7000 and 7100 MaxEmerge Planting Unit, parts catalog.
Manual for Deere 495 and 695 planters.
Monosem NG Plus seed meter; 1994 Monosem manual.
Fundamentals of Machine Operation—Planting, Deere & Co. (Breece et al 1981).
John Deere Planter Models 71 Flexi, 495A, 695A.
John Deere Operators Manual 694A, 695A, and 894A Corn Planters (OMB25391 E7).
John Deere 494-A and 495-A Four-row Corn Planters (A1477-62-12-Pltr. (Litho in USA)).
Ag Leader Technology, "Ag Leader SureSpeed", Feb. 17, 2020, Publisher: YouTube.
Ag Leader Technology, "Ag Leader SureSpeed Unveiling", Feb. 12, 2020, Publisher: Youtube.
Kinze Manufacturing, "True Speed—3D with Ultra Slow Motion", Feb. 24, 2020, Publisher: YouTube.
"High Speed Planting Solution True Speed", 2020, Publisher: Kinze.
Kinzemanufacturing, "An In-Depth Look into Kinze's True Speed", Feb. 26, 2020, Publisher: YouTube.
Tempo, 2017, Publisher: Vaderstad.
Precision Planting Furrowforce.
Precision Planting FurrowJet.
Precision tyne planter takes innovation award, 2017, https://www.graincentral.com/machinery/precision-tyne-planter-takes-innovation-award.
What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.
ZML Contour King, Youtube Video, Aug. 13, 2021.

(56) References Cited

OTHER PUBLICATIONS

360 Yield Sensor—Wave.
Deere SeedStar 2 Deere SeedStar XP Monitor for Planters.
Industrial Electronics Robust control of active suspensions for high performance vehicles, 1996.
Industrial electronics, modeling and force tracking control of hydraulic actuator for an active suspension system, 2006.
John Deere Delta Force Diagram.
Minesweeping Tank, Electrohydraulic System Using RBF Neural Network and Genetic Algorithm, 2010.
Page 130 of version 5.2 Operating Manual for the Ag Leader Integra, Part No. 4002083.
Salte et al. 1997-11-12 CZ203397A3 (Year: 1997).
Oberschmid Jan. 5, 1989 Seed-desposting Synchronising Device for High-speed Agricultural Seed Drills (Year: 1989).

* cited by examiner

SEED METER CONTROLLER AND ASSOCIATED TESTING DEVICES, SYSTEM, AND METHODS

CROSS-REFERENCE TO RELATED APPLICATION(S)

This application claims the benefit under 35 U.S.C. § 119(e) to U.S. Provisional Application 62/949,629, filed Dec. 18, 2019, and entitled "Seed Meter Controller and Associated Devices, Systems, and Methods," which is hereby incorporated herein by reference in its entirety for all purposes.

TECHNICAL FIELD

The disclosure relates to agricultural seeding systems, and more particularly, to devices, systems, and methods for testing planter row units.

BACKGROUND

It is understood in the art that seeder must be tested periodically to check for proper function. For electric drive seeders, operators must activate the individual row drives to verify that the seed meter system is functioning as intended. To verify that the system is functioning as intended each individual drive mechanism must be activated through the electrical control system such that an operator can see and hear each individual planter row unit operate and drop seed.

There is a need in the art for devices, systems, and methods for safely testing seeding systems on individual row units.

BRIEF SUMMARY

One general Example of the control system includes a seed meter testing system including a row control module, a sensor in communication with the row control module, and a seed delivery system, where the seed delivery system is activated by activation of the sensor.

In Example 1, a control system comprising a row control module, a first magnetic sensor in communication with the row control module, and a first row unit system in electronic communication with the row control module, wherein the first magnetic sensor causes the first row unit system to activate and deactivate.

Example 2 relates to the control system of Example 1, further comprising a magnet constructed and arranged to activate and deactivate the first magnetic sensor, wherein activation of the first magnetic sensor causes the first row unit system to activate and wherein deactivation of the first magnetic sensor causes the first row unit system to deactivate.

Example 3 relates to the control system of Example 2, wherein the first row unit system is an electric drive motor.

Example 4 relates to the control system of Example 1, further comprising a second magnetic sensor in communication with the row control module, and a second first row unit system in electronic communication with the row control module, wherein the second magnetic sensor causes the second row unit system to activate and deactivate.

Example 5 relates to the control system of Example 4, further comprising a magnet constructed and arranged to activate and deactivate the first and second magnetic sensors, wherein activation of the first and magnetic sensors causes the first and second row unit systems to activate and wherein deactivation of the first and second magnetic sensors causes the first and second row unit systems to deactivate.

Example 6 relates to the control system of Example 5, wherein the magnet comprises two polarities, a first polarity corresponding to the first magnetic sensor and a second polarity corresponding to the second magnetic sensor.

Example 7 relates to the control system of Example 1, wherein the first row unit system remain activated until deactivated by the first magnetic sensor.

In Example 8, an agricultural planter system comprising a plurality of row units, each row unit comprising a sensor in operative communication with at least one row unit device, wherein the sensor is constructed and arranged to turn the row unit device ON and OFF.

Example 9 relates to the planter of Example 8, wherein the sensor is selected from a magnetic sensor, a proximity sensor, a hall effect sensor, a reed switch, a solid state switch, an inductive sensor, a magneto-resistive sensor, a capacitive sensor, a remote optical sensor, and a linear position sensor.

Example 10 relates to the planter of Example 8, wherein the sensor is a magnetic sensor.

Example 11 relates to the planter system of Example 10, wherein the magnetic sensor is selected from a linear output analog sensor and a switching digital sensor.

Example 12 relates to the planter system of Example 10, further comprising a magnet constructed and arranged to operate the magnetic sensor.

Example 13 relates to the planter system of Example 12, wherein the magnet is a dual-polarity magnet.

Example 14 relates to the planter system of Example 12, wherein the magnet is functionally integrated into a seed digger tool.

In Example 15, a row unit testing system comprising a row control module, a magnetic sensor disposed on the row control module, wherein the magnetic sensor is constructed and arranged to detect magnetic fields and output a voltage corresponding to the detected magnetic field, and wherein the output voltage from the magnetic sensor results in activation and deactivation of the testing system.

Example 16 relates to the row unit testing system of Example 15, further comprising a magnet having a first pole and a second pole, detection of the magnetic field of the first pole causes the magnetic sensor to output a voltage resulting in activation of the testing system.

Example 17 relates to the row unit testing system of Example 16, wherein detection of the magnetic field of the second pole cause the magnetic sensor to output a voltage resulting in deactivation of the testing system.

Example 18 relates to the row unit testing system of Example 16, wherein the magnet is operatively integrated into a seed digger tool.

Example 19 relates to the row unit testing system of Example 15, further comprising a timer in operative communication with the magnetic sensor, wherein upon activation the testing system runs for a predetermined period of time set within the timer.

Example 20 relates to the row unit testing system of Example 15 wherein activation of the testing system causes one or more components of a row unit to turn on.

Implementations of these various Examples may include one or more of the following features. The system where the sensor is a magnetic sensor. The system where the magnetic sensor is activated by the presence of a first magnetic field. The system where the magnetic sensor is deactivated by the presence of a second magnetic field and where the second magnetic field has a polarity opposite a polarity of the first magnetic field. The system where the first and second magnetic fields are generated by a dual polarity magnet. The system where the dual polarity magnet is incorporated into a seed digger tool.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
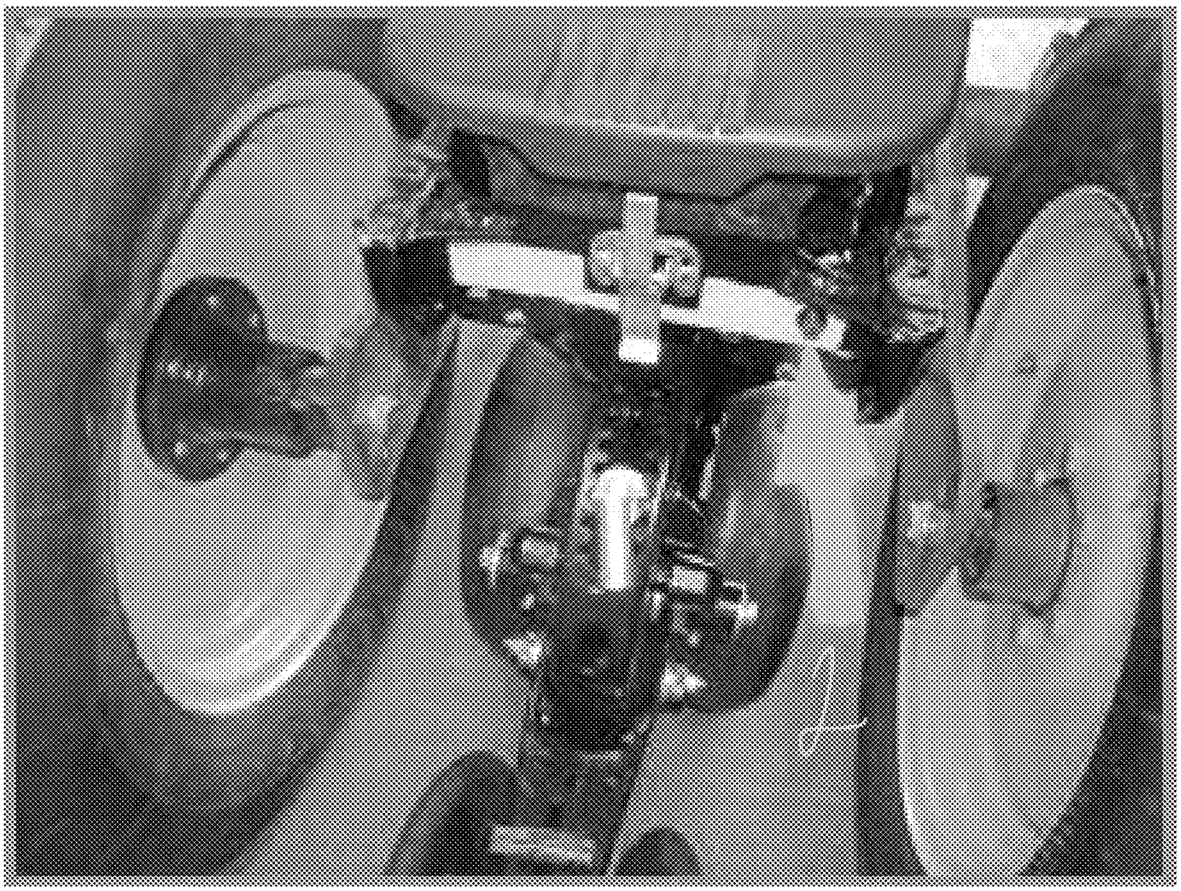
FIG. 1 depicts a known push button on a row unit.

The various implementations disclosed and contemplated herein relate to a planter testing and operation system. That is, the disclosure relates to devices, systems, and methods for testing and verifying the functionality of various components on agricultural planters. In various implementations, the systems are provided for testing the functionality of an electric drive seeder and/or other components of an agricultural row unit. In certain implementations, the systems, methods, and devices are remotely controlled and hands-free, such that users may activate individual row units to verify planter functionality and troubleshoot any errors. In some implementations, the systems, methods, and devices improve the safety of testing and operation of the planter row units and represent improvements in the testing systems thereof, as will be readily apparent to the skilled artisan. It would also be appreciated that the testing system described and contemplated herein may be adapted for use on various other agricultural machinery including harvesters, sprayers, and others as would be known to those of skill in the art.

Certain of the disclosed testing system implementations can be used in conjunction with any of the devices, systems or methods taught or otherwise disclosed in U.S. application Ser. No. 16/121,065, filed Sep. 1, 2018, and entitled "Planter Down Pressure and Uplift Devices, Systems, and Associated Methods," U.S. Pat. No. 10,743,460, filed Oct. 3, 2018, and entitled "Controlled Air Pulse Metering Apparatus for an Agricultural Planter and Related Systems and Methods," U.S. application Ser. No. 16/272,590, filed Feb. 11, 2019, and entitled "Seed Spacing Device for an Agricultural Planter and Related Systems and Methods," U.S. application Ser. No. 16/142,522, filed Sep. 26, 2018, and entitled "Planter Downforce and Uplift Monitoring and Control Feedback Devices, Systems and Associated Methods," U.S. application Ser. No. 16/280,572, filed Feb. 20, 2019 and entitled "Apparatus, Systems and Methods for Applying Fluid," U.S. application Ser. No. 16/371,815, filed Apr. 1, 2019, and entitled "Devices, Systems, and Methods for Seed Trench Protection," U.S. application Ser. No. 16/523,343, filed Jul. 26, 2019, and entitled "Closing Wheel Downforce Adjustment Devices, Systems, and Methods," U.S. application Ser. No. 16/670,692, filed Oct. 31, 2019, and entitled "Soil Sensing Control Devices, Systems, and Associated Methods," U.S. application Ser. No. 16/684,877, filed Nov. 15, 2019, and entitled "On-The-Go Organic Matter Sensor and Associated Systems and Methods," U.S. application Ser. No. 16/752,989, filed Jan. 27, 2020, and entitled "Dual Seed Meter and Related Systems and Methods," U.S. application Ser. No. 16/891,812, filed Jun. 3, 2020, and entitled "Apparatus, Systems, and Methods for Row Cleaner Depth Adjustment On-The-Go," U.S. application Ser. No. 16/921,828, filed Jul. 6, 2020, and entitled "Apparatus, Systems and Methods for Automatic Steering Guidance and Visualization of Guidance Paths," U.S. application Ser. No. 16/939,785, filed Jul. 27, 2020, and entitled "Apparatus, Systems and Methods for Automated Navigation of Agricultural Equipment," U.S. application Ser. No. 16/997,361, filed Aug. 19, 2020, and entitled "Apparatus, Systems, and Methods for Steerable Toolbars," U.S. application Ser. No. 16/997,040, filed Aug. 19, 2020, and entitled "Adjustable Seed Meter and Related Systems and Methods," U.S. application Ser. No. 17/011,737, filed Aug. 3, 2020, and entitled "Planter Row Unit and Associated Systems and Methods," U.S. application Ser. No. 17/060,844, filed Oct. 1, 2020, and entitled "Agricultural Vacuum and Electrical Generator Devices, Systems, and Methods," and U.S. application Ser. No. 17/105,437, filed Nov. 25, 2020, and entitled "Devices, Systems And Methods For Seed Trench Monitoring And Closing," each of which is incorporated herein in its entirety.

Returning to the disclosed testing system, it is understood that electric drive seeders are typically tested by using a switch 2 such as a mounted push button switch 2 like that shown in FIG. 1. On such planters, operators must hold down the push button switch 2 to cause the drive system to operate, and on these devices the drive system stops when the push button switch 2 is released. Those of skill in the art readily appreciate that to use these known testing systems, various components must be installed at specified mounting locations on each row unit. As such, these known systems can be difficult to implement across varying models of row units. Further, in these known systems, the operator must be physically near each row unit to be able to press and hold down the switch 2 for the duration of testing.

The disclosed testing system 10 improves upon these processes in several respects. For example, in various implementations, the testing system 10 described herein allows for activation of individual row unit drives via magnetic or other sensor systems such that the row unit drive or other mechanism to be tested remains activated without an operator needing to be physically present at the row unit. In certain implementations, a row unit drive may be activated to verify the functionality of the seed meter system. In further implementations, a row unit drive may be activated to empty the hopper/seed bin container or other function as would be appreciated.

In certain implementations, the testing system 10 allows for control of the row unit, or various components, systems, or sub-systems thereof, such that a user can be close to the area that is being controlled when toggling ON and OFF, but need not be physically present to maintain the row unit in the ON position as required by prior known systems. In certain prior known systems, a user may need to coordinate with a second person to turn functions ON and OFF from a control panel typically located in the cab of a tractor or to traverse between the cab and the planter for each test. These alternatives are time consuming and/or larger uses of manpower and thereby more costly to stakeholders.

In further implementations, the system allows a user to have both hands-free during operation allowing for performance of other duties or tasks. Further the system 10, eliminates the need for a user to have a display unit or other control unit to activate individual seed meter sections or other components as would be understood. Use of a display unit or other control unit may be detrimental as care must be taken to avoid damaging such a unit and/or requiring use of one or more hands.

Figure 2:
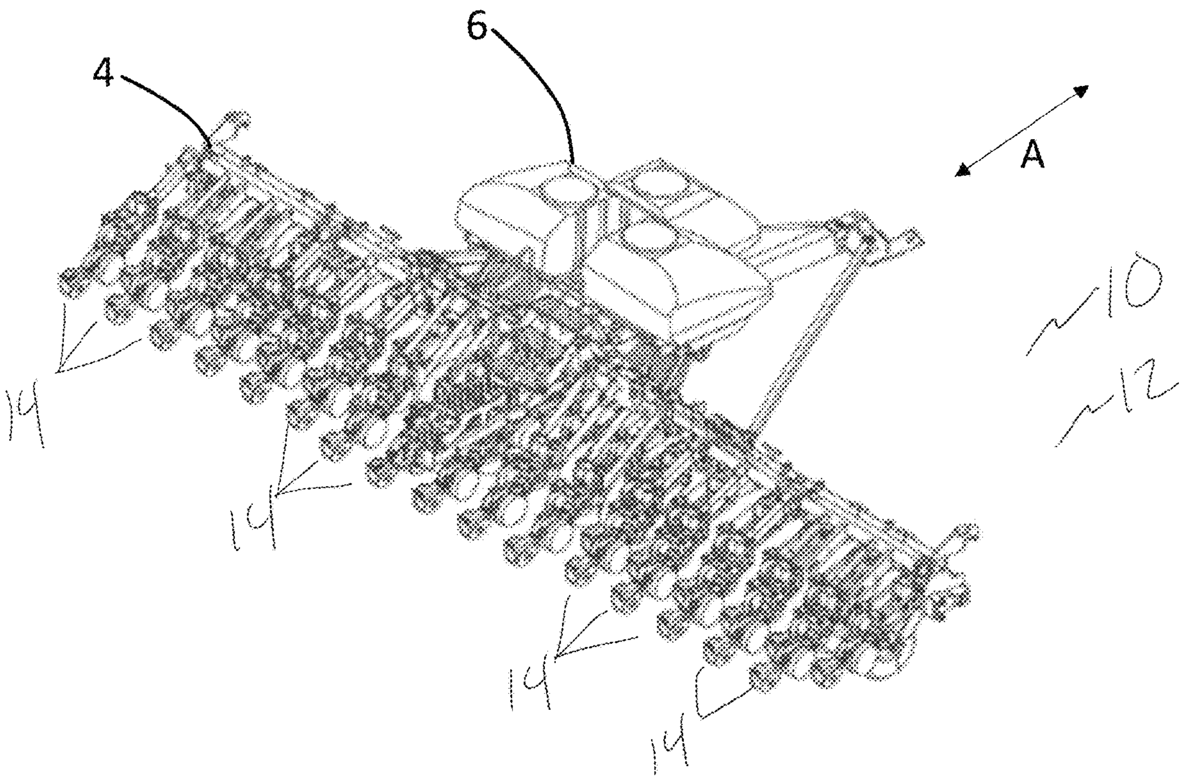
FIG. 2 is a perspective view of an exemplary planter, according to one implementation.

Turning to the figures in greater detail, FIG. 2 depicts a planter 12 fitted with an exemplary implementation of the disclosed system 10. Such implementations of the system 10 are adapted to operate with such a planter 12 including a plurality of row units 14 constructed and arranged for planting row crops such as corn, optionally at high speed.

The planting machine 12 in this specific implementation is a row crop planter 12 having a central crossbar 4 and multiple planting row units 14 mounted to the crossbar 4. It is understood that, generally, the row units 14 on a particular planter (such as exemplary planter 12) are typically identical or substantially similar. The seeding machine 12 moves forward and backward via the fore-aft direction shown by the arrow A.

In various implementations, the planter 12 includes at least one hopper 6 to hold seed. In certain implementations, the planter 12 includes unit hoppers on each planting unit 14 such that seed can be delivered from the hopper 6 to a unit hopper (such as hopper 7 shown in FIG. 3A) on each unit 14. In a further alternative implementation, any known hopper or seed retention device configuration can be incorporated into the planter 12 and the separate row units 14 and function with a testing system 10 implementation as described herein.

Figure 3A:
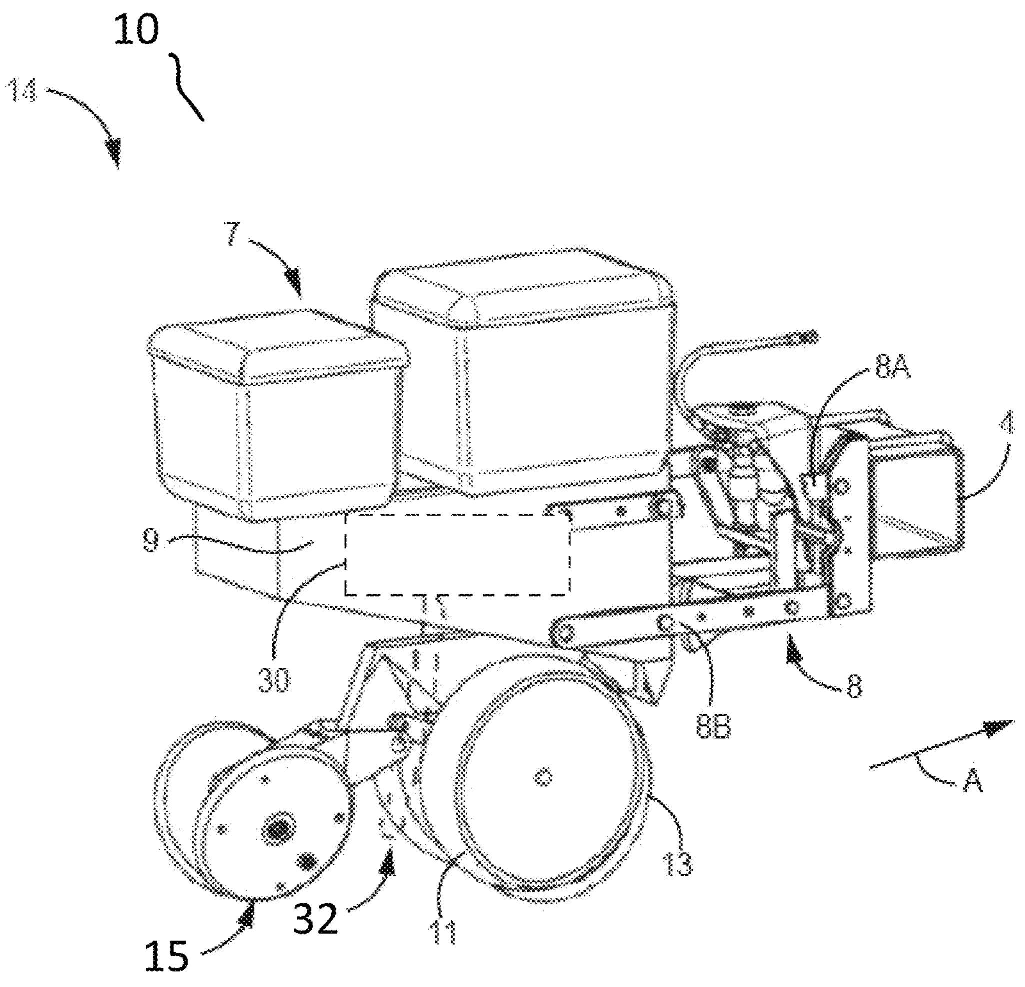
FIG. 3A is a side perspective view of an exemplary row unit, according to one implementation.
Figure 3B:
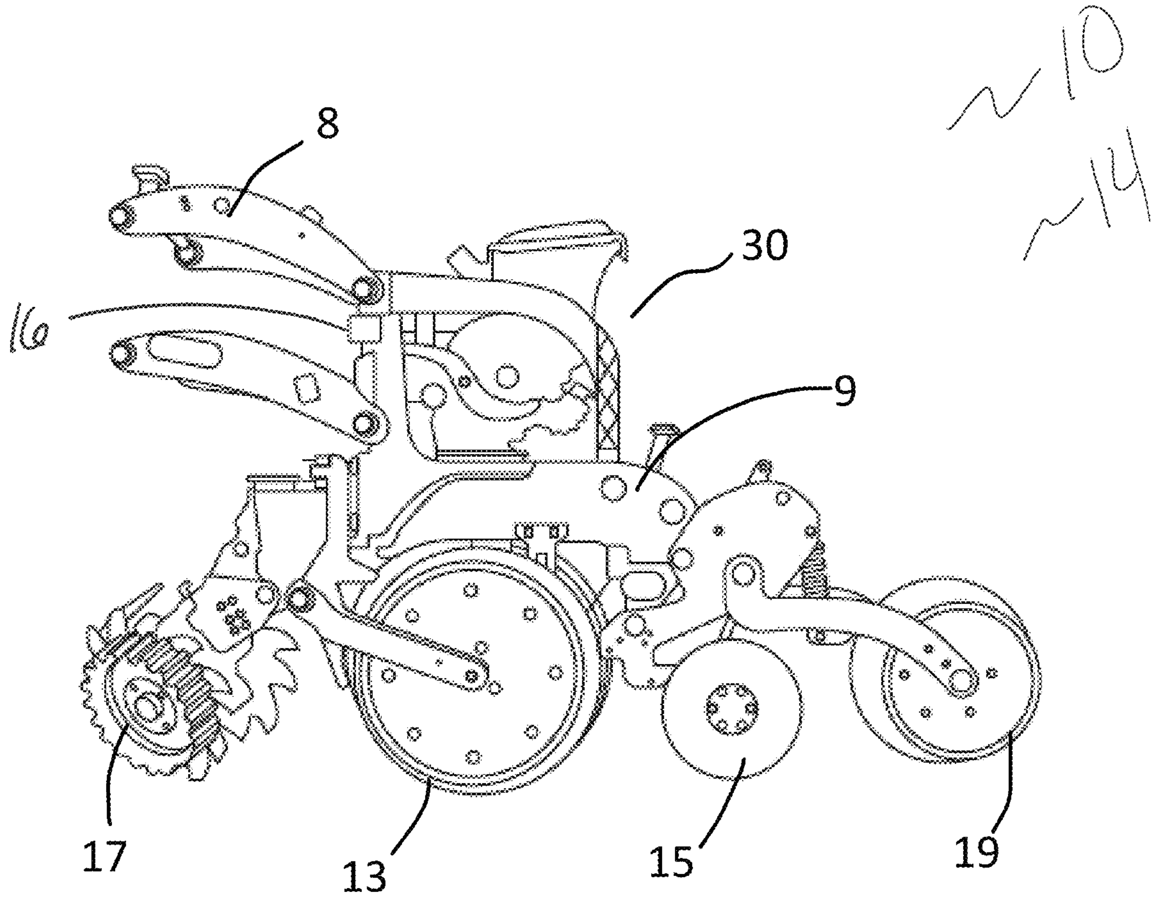
FIG. 3B is a side view of an exemplary row unit, according to one implementation.

Examples of row units 14 having a testing system 10 are depicted in greater detail in FIGS. 3A-B. It is understood that the testing system 10 according to any implementation disclosed or contemplated herein can be incorporated into any known row unit 14 having any configuration.

The particular exemplary row unit 14 of FIG. 3A is jointedly coupled to the central crossbar 4 via a parallelogram linkage 8 made up of two linkage arms 8A, 8B such that the individual units 14 are vertically moveable by a predetermined amount relative to the crossbar 4. The exemplary row unit 14 in this implementation has known components, including a hopper 7, gauge wheels 11 (controlling the depth of the furrow), furrow opening disks 13 (to form an open furrow in the soil beneath the seeding machine 12 into which seed is deposited), and a closing and/or packing wheel (or wheels, in this specific example) 15 (to close the furrow over the deposited seed and to firm the soil in the closed furrow), as are generally understood in the art.

Another exemplary row unit 14 is shown in FIG. 3B. In this particular exemplary row unit, known components such as a row cleaner 17 (for clearing debris around a row unit 14) and press wheel 19 (for firming soil after planting) are provided. Further in this implementation, a row control module ("RCM") 16 is disposed on the row unit 14 for controlling various components of the row unit 14. Alternatively, any similar known components or features or additional known features or components can be incorporated into the row units 14.

In various implementations, a seed metering system 30 is disposed on the row unit 14, and more specifically, coupled to, or disposed within, the frame member 9 thereof, such that it can be in operable communication with a hopper 7. The frame member 9 is jointedly coupled to the parallelogram linkage 8. The seed is stored or retained in the seed hopper 7 and provided to the seed meter system 30 by any appreciated mechanism.

From the seed meter system 30, the seed is carried by a delivery system 32 into a planting furrow, or trench, formed in the soil by furrow opening disks 13. It is understood that the test system 10 implementations, as disclosed or contemplated herein, can be coupled to and operate with any known seed meter system 30, seed delivery system 32, or other component of the row unit 14.

Figure 3C:
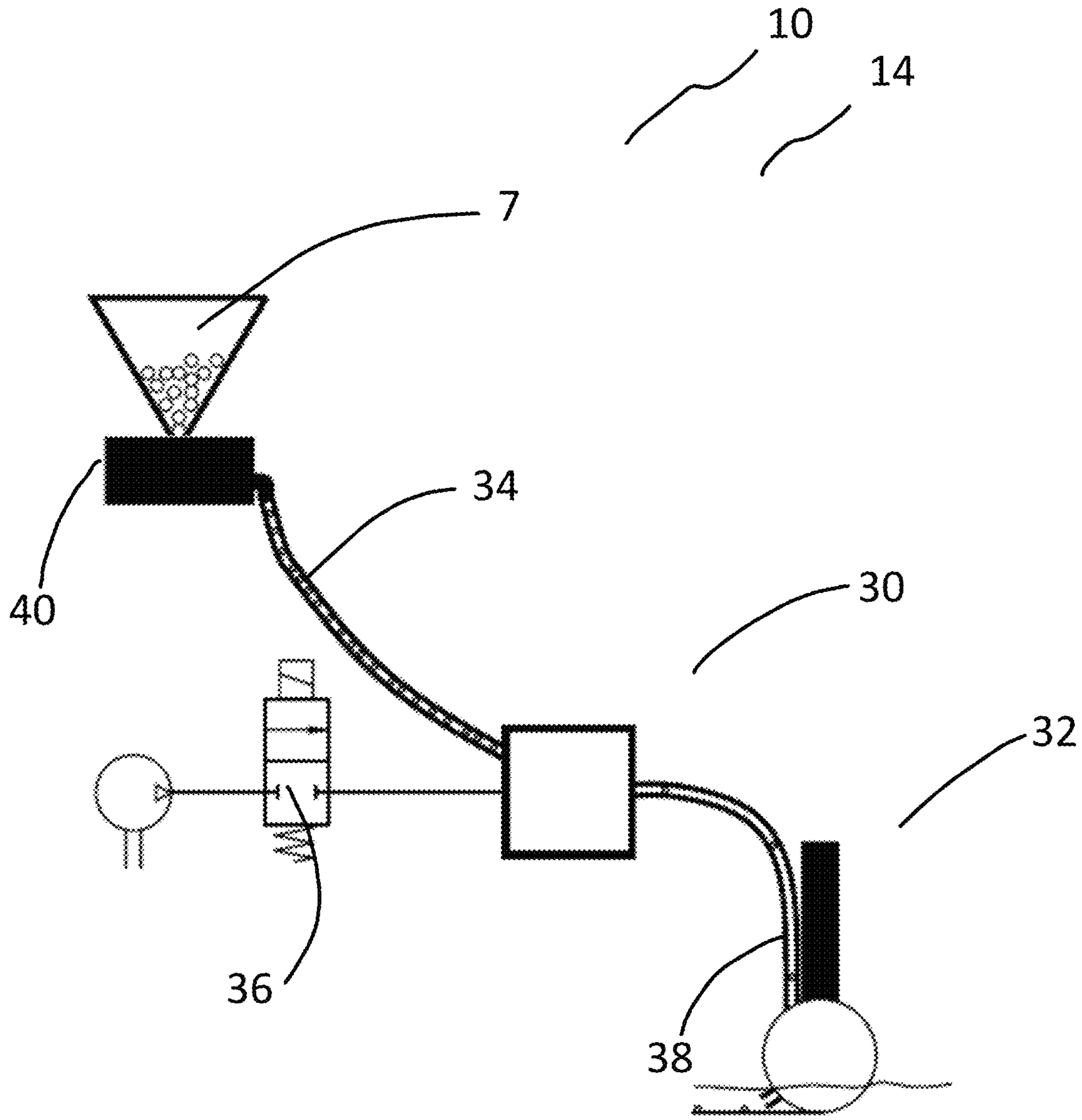
FIG. 3C is a schematic view of various row unit components, according to one implementation.

A diagrammatic depiction of a seed metering system 30 incorporated into a row unit 14 according to one embodiment is shown in FIG. 3C. Certain components of the row unit 14 are depicted schematically, including the seed hopper 7, the seed feeding tube 34, the seed metering system 30, a valve 36 and the seed delivery system 32. The seed delivery apparatus 32 has a seed delivery tube 38 and furrow opening disks 13. It is understood that the various components depicted in FIG. 3C constitute components of a row unit 14, which, while being depicted schematically in this figure, can take the form of any known row unit 14 configuration. As such, in certain implementations, each row unit (such as row unit 14) on a planting machine 12 can have all of these components. Other row unit 14 configurations are also contemplated herein and would be readily appreciated by those of skill in the art.

In certain implementations, the row unit 14 includes a seed singulation device 40 operatively engaged with the hopper 7, such that seeds from the hopper 7, or other seed retention device, move through the seed singulation device 40. The seed singulation device 40 operates to isolate or singulate seeds such that in the seed feeding tube 34 seeds are conveyed in a separate and singular fashion. Various seed singulation devices 40 and systems would be appreciated by those of skill in the art.

In some implementations, the testing system 10 is used to control a motor of a seed meter system 30, such as a brushless DC motor, as would be understood. In various alternative implementations, the testing system 10 can be used in connection with other systems and devices, including but not limited to, a seed delivery system 32, a singulation device 40, valves 36, flow meters, linear encoders, position sensors, solenoids, spray nozzles, and other devices as would be recognized by those of skill in the art. Various row unit 14 components and systems are described for example in the incorporated references. In various implementations, an individual row unit 14 may include one or more testing systems 10 or sensors 20 (shown and described in further detail below in FIGS. 4-5) to control one or more devices/systems.

In further implementations, the testing system 10 allows a user to activate individual sensors or devices or subsystems thereof while being physically near the individual row units 14, as noted above. In certain implementations, a user may not need to be present at the row unit 14 during use of the system 10. In one example, a spray nozzle can be operated by a user such that each nozzle is operated while the user is standing near the spray nozzle.

Because the user is near the spray nozzle while it is activated, or at least at initial activation, the user can verify functionality, settings, and spray patterns, as well as inspect the equipment for erosion, corrosion, caking, mechanical damage, or orifice clogging by observing the nozzle while it is operating. Such operation when the user is nearby allows, the user can detect any issues or potential issues and troubleshoot them. Further, being able to toggle components ON and OFF when near the components themselves allows for a user to quickly react to conditions which may allow for testing, calibration, or other processed to be conducted more quickly, as would be readily appreciated.

Figure 4:
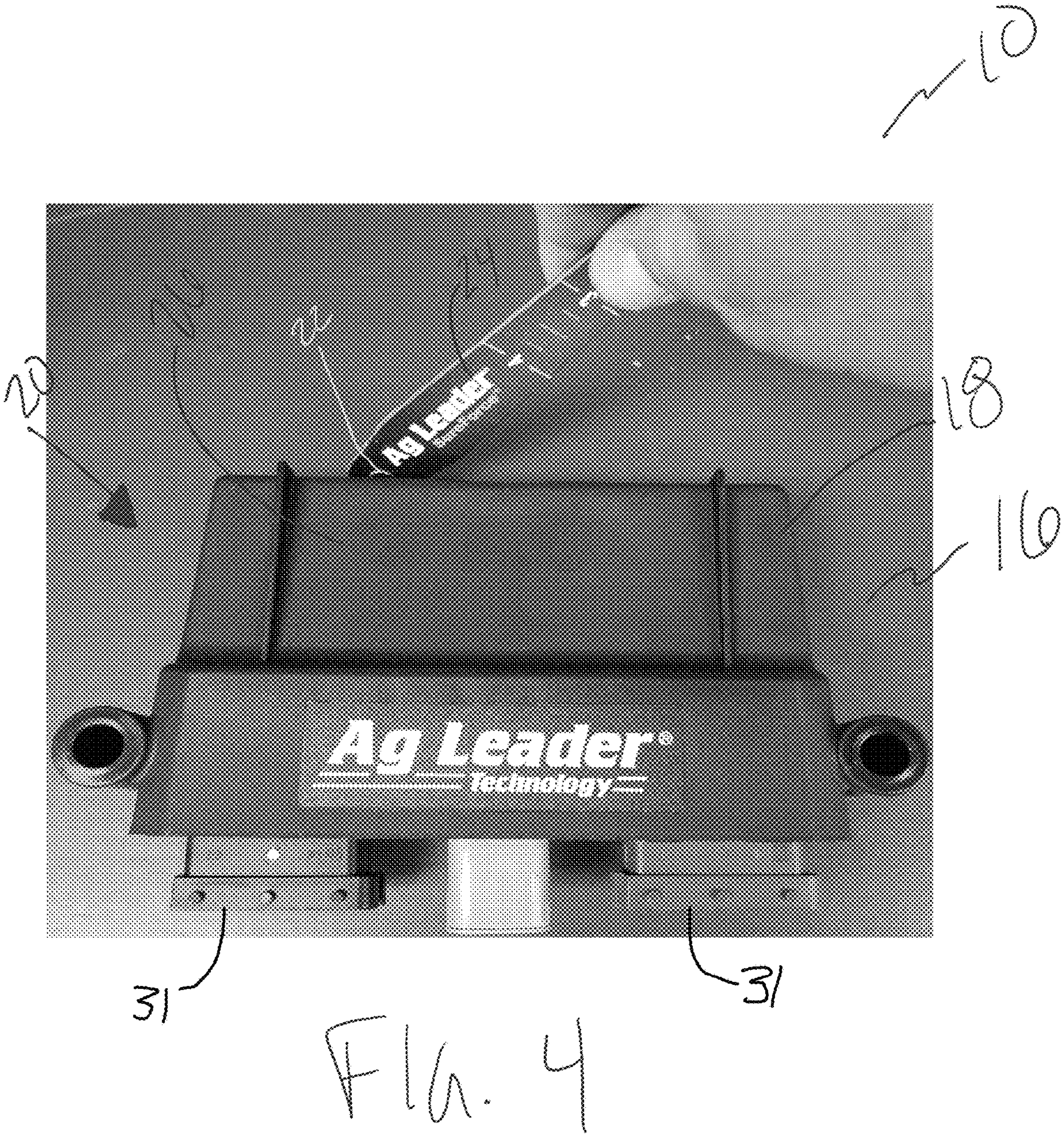
FIG. 4 is a side view of a row control module and magnet, according to one implementation.
Figure 5:
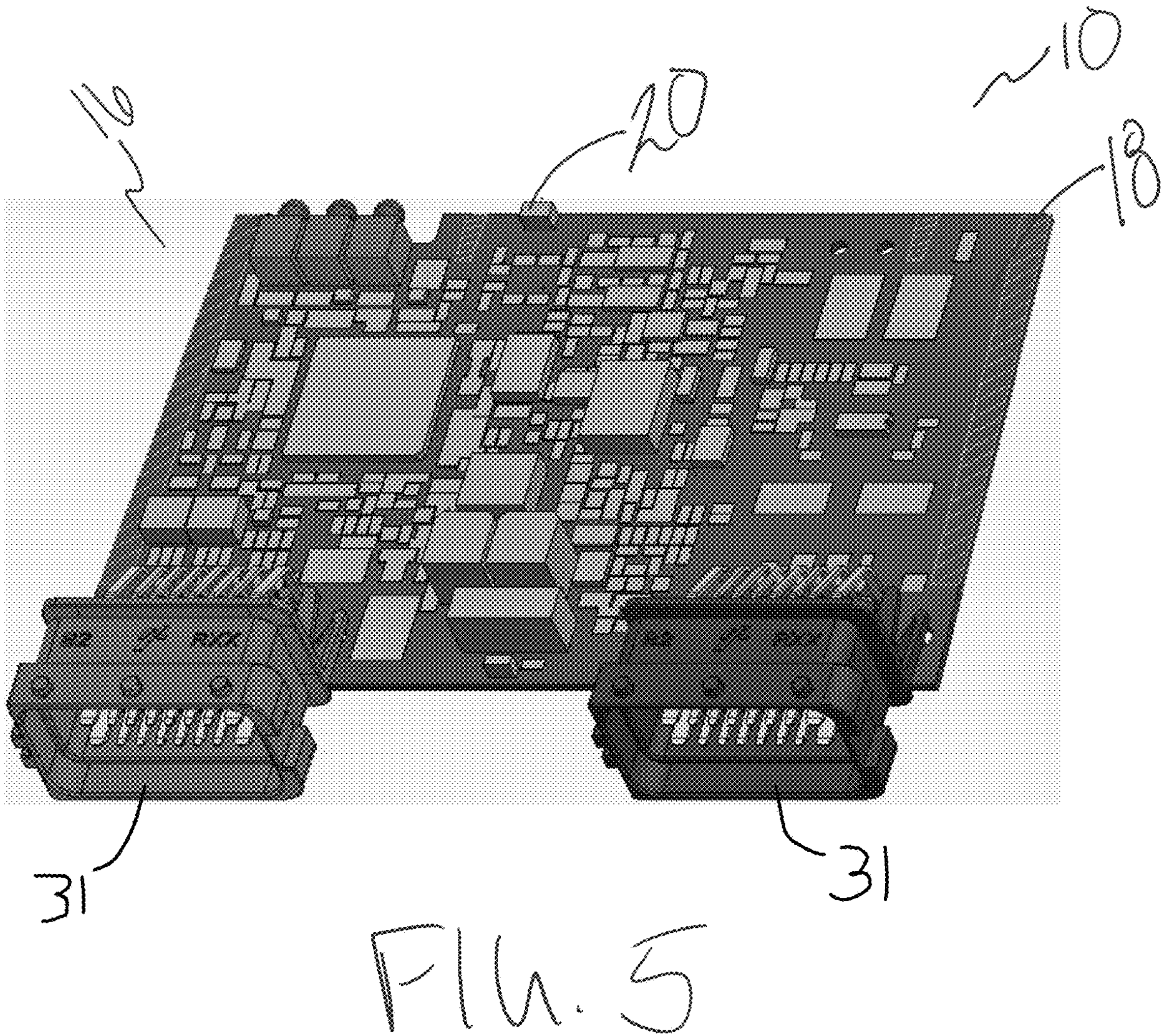
FIG. 5 is a perspective view of a row control module circuit board, according to one implementation.

Turning now to FIGS. 4 and 5, in certain implementations, a sensor 20 is integrated with and/or is in communication with a row control module ("RCM") 16. In some implementations, the sensor 20 is embedded in the RCM 16 circuit board 18 such as a printed circuit board ("PCB") or other circuit board 18, and the RCM 16 circuit board 18 is in communication with the electric motor drive of the planter 12 row unit 14 or other row unit 14 system such as a seed meter system 30 or delivery system 32 via hardwire connections 31, as would be appreciated. In further implementations, the RCM 16 circuit board 18 is in communication with any device or system to be controlled by the testing system 10, such as via the one or more hardwire connections 31. In some implementations, the RCM 16 includes more than one sensor 20 to control multiple devices and/or systems on the row unit 14. Further connections are of course possible, and it is readily appreciated that a variety of circuit board 18 configurations having a variety of components can be utilized to effectuate the described processes of the circuit board 18 within the system.

In various implementations, the testing system 10 may cause the seed meter system 30 or alternative subsystem to operate at predetermined conditions, such as according to logic programmed into the circuit board 18 and processing components/memory. In various implementations, the predetermined conditions may or may not be standard operating conditions or settings used during planting operations. In certain implementations, the testing system 10 may cause the seed meter system 30, or other operatively engaged device to operate at one or more extremes of its operation, or cycling through a range of conditions, as would be appreciated.

In various implementations, the sensor 20 is a magnetic sensor 20. In alternative implementations, the sensor 20 may be a proximity sensor, hall effect sensor, reed switch, solid state switch, inductive sensor, magneto-resistive sensor, capacitive sensor, remote optical sensor, and/or linear position sensor. The system 10 may be adjusted and/or modified to use the above listed sensors 20 and technologies, as would be readily appreciated.

Figure 6:
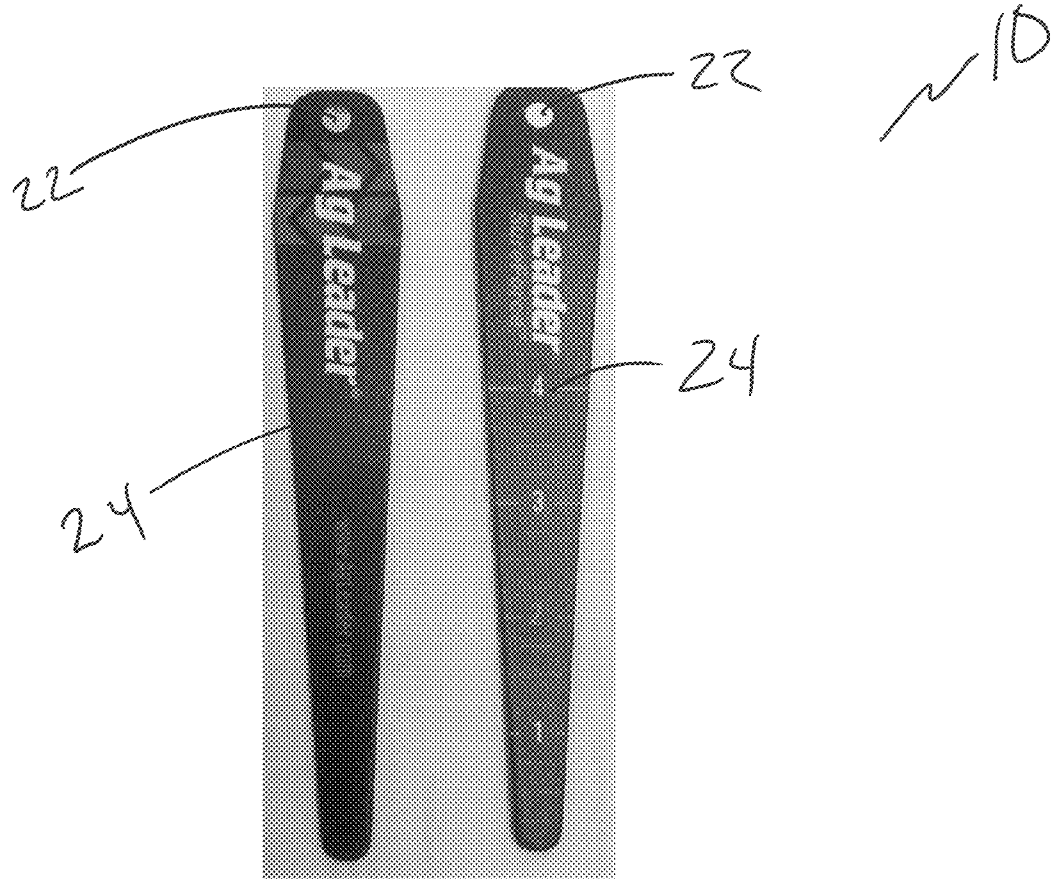
FIG. 6 shows a side view of seed digger tools, according to one implementation.

In various implementations, the RCM 16 is programmed such that when a magnet 22, shown in FIGS. 4 and 6, is placed on or near the sensor 20 the testing system 10 is activated. In alternative implementations, the testing system 10 may be activated by any appropriate activation mechanism corresponding to the sensor 20 type, as would be appreciated. In implementations having a magnetic sensor 20, the magnet 22 may have a specific polarity corresponding to the sensor 20. In some of these implementations, the testing system 10 may continue to operate until a magnet 22 of the opposite polarity is placed on or near the sensor 20, thereby deactivating the testing system 10.

In various implementations, the testing system 10 remains in operation/an activated state after the magnet 22 is removed from the proximity of the RCM 16. In these and other implementations, a user/operator may move about the machine while the testing system 10 is operating. For example, as the seed meter system 30, seed delivery system 32, and/or row unit 14 are operating. This is an advantage over prior known systems, noted above, that require a user to remain in contact with a switch during operation. Further, in these implementations, the operator's hands may remain free such that the operator may engage in other activities such as performing repairs, adjusting settings, or other work as needed, while the testing system 10 is activated, as would be appreciated.

Further the testing system 10 may be integrated with existing components of the planter 12 and/or row unit 14. The testing system 10, disclosed herein, does not require a dedicated mounting location, external components, or installation labor that is required by known switch-based systems. Still further, the system 10 may have further advantages including low operating power, no mechanically moving parts, fast response time, long life, small physical size, high durability, and no sensitivity to vibration.

Turning back to the figures in more detail, as shown in FIGS. 4 and 5 the RCM 16 incorporates a magnetic based sensor 20 that is configured to detect the presence of a proximate magnetic field. When a proximate magnetic field is detected, the system 10 generates a voltage that increases in direct proportion to the magnetic flux density.

In various implementations, the magnetic sensor 20 is located at or near the edge of the circuit board 18, thereby allowing the magnetic field to overcome any interference created by the RCM 16 housing 26 and/or the potting material residing inside the RCM 16 housing 26. Further locating the sensor 20 near or close to the outside of the RCM 16 housing 26 may allow for control of the sensor 20 without needing direct access to the circuit board 18 or interior of the RCM 16. Other sensor 20 locations are of course possible.

In further implementations, the magnetic sensor 20 has a range such that the sensor 20 can detect the magnetic field of the magnet 22 through the RCM 16 housing 26. In some implementations, the sensor 20 is arranged on the circuit board 18, and the circuit board 18 and RCM 16 are arranged on the row unit 14, in such a manner as to allow easy access to the portion of the RCM 16 where the sensor 20 is located.

The magnetic sensor 20 may be a linear output (analog) sensor, a switching (digital) sensor, or any other kind of magnetic sensor 20 as would be appreciated by those of skill in the art. In some implementations, a linear output (analog) sensor is used to obtain an output voltage that is directly proportional to the magnetic field present, as would be understood. In alternative implementations, a switching (digital) sensor is used to obtain an ON or OFF signal.

In further implementations, the system 10 may further include a latch, a momentary device, or other device as would be appreciated by those of skill in the art.

In some implementations, the latching device and system 10 is activated by placing one magnetic pole (either South or North) within sensing vicinity of the sensor 20. In these implementations, after the system 10 is activated, it will remain activated until the opposite magnetic pole (either North or South) is placed within sensing range of the sensor 20. The opposite magnetic pole causes the sensor 20 and therefore system 10 to revert to an inactive state thereby shutting the tested system 10 and/or device off, as would be understood.

In an alternate implementation, the system 10 comprises a momentary device. In these and other implementations, a magnetic field is placed within sensing range of the sensor 20, thereby activating the system 10 and tested device. The testing system 10 and device or system being tested remains in the active or ON state as long as the magnetic field is within range of the sensor 20. The testing system 10 will revert to the inactive or OFF state when the magnetic field is removed from the sensing range of the sensor 20.

In further implementations, the duration of the output is controlled via a microprocessor on the RCM 16. In these and other implementations, a timer can be used to run the testing system 10 and associated device, system, or subsystem of the row unit 14 for a predetermined amount of time. The timer may allow a user to check the operation of a device or system and allow the user to troubleshoot a device or system for potential errors.

Turning to FIG. 6, in various implementations, a magnet(s) 22, may be incorporated into a common tool 24 or device for ease of access, use, and storage. In some implementations, the magnet(s) 22 may be integrated into a seed digger tool 24, shown for example in FIG. 6. Seed digger tools 24 are commonly used by planter operators/users to verify seed placement and planting population such that integration with the magnet(s) 22 creates a multi-purpose tool 24. In some implementations, a magnet such as a cylinder magnet 22 is integrated into an opening on one end of the seed digger tool 24. It is of course appreciated that the tool 24 can come in any number of shapes and sizes in order to effectuate the described processes and systems.

In various implementations, the magnet 22 is a dual-polarity magnet 22 such that one magnet 22 can perform both activating and inactivating functions. Further implementations utilize additional magnet types.

In alternative implementations, the magnet(s) 22 may be integrated into various other tools such as, a volumetric measuring device, pliers, pocketknife, rubber gloves, or other device as would be recognized by those of skill in the art. In various implementations, a magnet 22 can be incorporated into or attached to any device that an operator/user is frequently carrying or using. In these implementations, the magnet 22 is less likely to be misplaced.

Although the disclosure has been described with references to various embodiments, persons skilled in the art will recognized that changes may be made in form and detail without departing from the spirit and scope of this disclosure.

What is claimed is:

1. A control system comprising:
(a) a row control module;
(b) a first magnetic sensor in communication with the row control module;
(c) a second magnetic sensor in communication with the row control module;
(d) a first row unit system in electronic communication with the row control module;
(e) a second row unit system in electronic communication with the row control module; and
(f) a magnet having two polarities constructed and arranged to activate and deactivate the first and second magnetic sensors wherein a first polarity corresponds to the first magnetic sensor and a second polarity corresponds to the second magnetic sensor,
wherein the first magnetic sensor causes the first row unit system to activate and deactivate and the second magnetic sensor causes the second row unit system to activate and deactivate.

2. The control system of claim 1, wherein activation of the first magnetic sensor causes the first row unit system to activate and wherein deactivation of the first magnetic sensor causes the first row unit system to deactivate.

3. The control system of claim 2, wherein the first row unit system is an electric drive motor.

4. The control system of claim 1, wherein the first row unit system remains activated until deactivated by the first magnetic sensor.

5. An agricultural planter system comprising a plurality of row units, each row unit comprising:
(a) a first magnetic sensor in operative communication with a first row unit device;
(b) a second magnetic sensor in operative communication with a second row unit device;
(c) a dual polarity magnet constructed and arranged to operate the first magnetic sensor and second magnetic sensor, wherein a first polarity corresponds to the first magnetic sensor and a second polarity corresponds to the second magnetic sensor,
wherein the first magnetic sensor is constructed and arranged to turn the first row unit device ON and OFF and wherein the second magnetic sensor is constructed and arranged to turn the second row unit device ON and OFF.

6. The planter system of claim 5, wherein the first magnetic sensor and second magnetic sensor are selected from a linear output analog sensor and a switching digital sensor.

7. The planter system of claim 5, wherein the magnet is functionally integrated into a seed digger tool.

8. A row unit testing system comprising:
(a) a row control module;
(b) a magnetic sensor disposed on the row control module; and
(c) a magnet having a magnetic field; and
(d) a timer in operative communication with the magnetic sensor,
wherein the magnetic sensor is constructed and arranged to detect the magnetic field and output a voltage corresponding to the detected magnetic field, and wherein the output voltage from the magnetic sensor results in activation of the row unit testing system when the row unit testing system is deactivated and deactivation of the row unit testing system when the row unit testing system is activated, and wherein upon activation the row unit testing system runs for a predetermined period of time set within the timer.

9. The row unit testing system of claim 8, wherein the magnet has a first pole and a second pole, detection of a magnetic field of the first pole causes the magnetic sensor to output a voltage resulting in activation of the row unit testing system.

10. The row unit testing system of claim 9, wherein detection of a magnetic field of the second pole cause the magnetic sensor to output a voltage resulting in deactivation of the row unit testing system.

11. The row unit testing system of claim 9, wherein the magnet is operatively integrated into a seed digger tool.

12. The row unit testing system of claim 8, wherein activation of the row unit testing system causes one or more components of a row unit to turn ON.

13. The control system of claim 1, wherein the second row unit system remains activated until deactivated by the second magnetic sensor.

14. The control system of claim 1, wherein activation of the second magnetic sensor causes the second row unit system to activate and wherein deactivation of the second magnetic sensor causes the second row unit system to deactivate.

15. The control system of claim 1, wherein the first magnetic sensor and second magnetic sensor are selected from a linear output analog sensor and a switching digital sensor.

16. The planter system of claim 5, wherein activation of the first magnetic sensor causes the first row unit device to activate and wherein deactivation of the first magnetic sensor causes the first row unit device to deactivate.

17. The planter system of claim 16, wherein activation of the second magnetic sensor causes the second row unit device to activate and wherein deactivation of the second magnetic sensor causes the second row unit device to deactivate.

18. The planter system of claim 5, wherein the first row unit device remains activated until deactivated by the first magnetic sensor.

19. The planter system of claim 18, wherein the second row unit system remains activated until deactivated by the second magnetic sensor.

20. The row unit testing system of claim 8, wherein the magnetic sensor is selected from a linear output analog sensor and a switching digital sensor.

* * * * *